US007031957B2

(12) United States Patent
Harris

(10) Patent No.: US 7,031,957 B2
(45) Date of Patent: Apr. 18, 2006

(54) METHODS AND SYSTEMS FOR CREATING A VIRTUAL WORK ENVIRONMENT WITHIN WHICH TO DEVELOP IDEAS AND PERFORM INTELLECTUAL WORK

(75) Inventor: Douglas O. Harris, Bountiful, UT (US)

(73) Assignee: Engage Thoughtware, Bountiful, UT (US)

( * ) Notice: Subject to any disclaimer, the term of this patent is extended or adjusted under 35 U.S.C. 154(b) by 0 days.

(21) Appl. No.: 10/281,339

(22) Filed: Oct. 25, 2002

(65) Prior Publication Data

US 2003/0105769 A1 Jun. 5, 2003

Related U.S. Application Data

(60) Provisional application No. 60/379,490, filed on May 10, 2002, provisional application No. 60/335,261, filed on Oct. 30, 2001, provisional application No. 60/348,311, filed on Oct. 29, 2001.

(51) Int. Cl.
*G06F 17/30* (2006.01)
*G06F 7/00* (2006.01)
(52) U.S. Cl. ............................................. 707/3; 707/10
(58) Field of Classification Search .................... 707/4, 707/10, 3; 709/206, 314
See application file for complete search history.

(56) References Cited

U.S. PATENT DOCUMENTS

| 5,107,443 | A | * | 4/1992 | Smith et al. ................. 715/751 |
| 5,884,272 | A | * | 3/1999 | Walker et al. ................. 705/1 |
| 6,308,175 | B1 | * | 10/2001 | Lang et al. .................... 707/10 |
| 6,443,841 | B1 | * | 9/2002 | Rossides ....................... 463/25 |
| 6,453,306 | B1 | * | 9/2002 | Quelene ....................... 705/80 |
| 6,594,654 | B1 | | 7/2003 | Salam et al. |
| 6,687,878 | B1 | * | 2/2004 | Eintracht et al. ........... 715/512 |
| 6,769,013 | B1 | * | 7/2004 | Frees et al. .................. 709/205 |
| 2001/0042037 | A1 | * | 11/2001 | Kam et al. ..................... 705/36 |
| 2002/0099775 | A1 | * | 7/2002 | Gupta et al. ................ 709/205 |
| 2002/0138582 | A1 | * | 9/2002 | Chandra et al. ............ 709/206 |

OTHER PUBLICATIONS

Vaughan-Nichols, Steven J. Inexpensive online conferencing. (Collabra Software Inc's Collabra Share 2.0) (Software Review) (Evaluation), Jul. 1995.*
The Wiki Way (from Wikipedia, the free encyclopedia) Jun. 21, 2005.*
Bay-Wei Chang. In-Place Editing of Web Pages: Sparrow Community-Shared Documents. Jun. 15, 2002.*
"Knowledge Management: Four Obstacles to Overcome," reprint from the *Harvard Management Update*, Aug. 2000, as published at *Harvard Business School Working Knowledge: Innovation*, <http://hbswk.hbs.edu/item.jhtml?id=2044&t=innovation>, Feb. 26, 2001, pp. 1-5.

(Continued)

*Primary Examiner*—Jean M. Corrielus
*Assistant Examiner*—Baoquoc N. To
(74) *Attorney, Agent, or Firm*—Workman-Nydegger

(57) ABSTRACT

A system for facilitating engagement of one or more subscribers, the system including a subscriber module that is adapted to communicate with a data store by way of a network. The subscriber module is adapted to enable one or more subscribers to link a first document and a second document as the subscribers engages with at least one of the first document and the second document. The engagement of the subscriber is performed with a level of anonymity with respect to another subscriber.

59 Claims, 15 Drawing Sheets

OTHER PUBLICATIONS

Hamel, G., "Leading the Revolution," as published at *Harvard Business School Working Knowledge: Innovation*, <http://hbswk.hbs.edu/pubitem.jhtml?id=1680&t=innovation>, Sep. 11, 2000, pp. 1-7.

Harris, D., "Worlds Apart: The Nature of Work and Organizational Transcendence," 2001, pp. 1-20.

Harris, D., Ph.D. and S.W. Alley, M.A., Incubating Your Own Competitors: Why Some Employees Rather "Go It" Alone Than Develop Ideas "In House," 2001, pp. 1-7.

Masum, H., "Tool: The Open Opinion Layer," *First Monday*, Jul. 2002, vol. 7, No. 7, as published at *First Monday*, <http://www.firstmonday.dk/issues/issue7_7/masum/>, pp. 1-24.

Silverthone, S., "Time Pressure and Creativity: Why Time is Not on Your Side," as published at *Harvard Business School Working Knowledge: Strategy*, <http:hbsworkingknowledge.hbs.edu/item.jhtml?id=3030&t=strategy>, Jul. 29, 2003, pp. 1-7.

Tippetts, R.H., and D. O. Harris,"Creating a Learning Organization: The Graunch Who Stole Business," *Utah Business*, Nov./Dec. 1994, pp. 136-139.

Tippetts, R.H., and D. O. Harris,"Creating a Learning Organization: Procrastination—Fixing the Right Problem," *Utah Business*, Jul./Aug. 1994, pp. 140-141.

Tippetts, R.H., and D. O. Harris,"Creating a Learning Organization: Voice in a Digital World," *Utah Business*, Sep./Oct. 1994, pp. 166-168.

Turoff, M. and S. R. Hiltz, "Computer Based Delphi Processes," as published at <http://eies.njt.edu/~turoff/Papers/delphi3.html>, pp. 1-24.

Wenger, E., "Seven Principles for Cultivating Communities of Practice," excerpted from "Cultivating Communities of Practice: A Guide to Managing Knowledge," *Harvard Business School Press*, 2002, as published at *Harvard Business School Working Knowledge: Organizations*, <http:hbsworkingknowledge.hbs.edu/item.jhtml?id=2855&t=organizations>, Mar. 25, 2002, pp. 1-10.

http://web.archive.org/web/20011005221233/slashdot.org available to the public at http://www.slashdot.org/ on Oct. 5, 2001 (13 pages).

http://www.sis.pit.edu/~spring/cas.node118.html#SECTION00072000000000000000 University of Pittsburgh School of Information Sciences, Programs, Collabra Share, 1 page, date unknown.

http://sillydog.org/netscape/guide/collabra.html, Netscape Collabra, 1 page, date unknown.

http://www.objs/com/survey/groupwar.htm, Groupware & Collaboration Support, Collabra Share, 1 page, date unknown.

http:www.networkcomputing.com/704/704f1.html, Groupware: Colonizing New Ground for Industrious Networks, Attachmate OpenMind, Netscape Collabra Share and SoftArc FirstClass, 3 pages, date unknown.

http://www.microsoft.com/technet/archive, Microsoft TechNet>>Microsoft Mail>>Third-Party Sharing Applications for Microsoft Mail 3.2, Collabra Share, 3 pages, date unknown.

http://www.novell.com/news/press/1995/05/pr00108.html, Novell to Release Collabra Share 2.0 for GroupWise, 2 pages, date unknown.

http://www.networkcomputing.com/601/601rev2.html, Network Computing Magazine, All You Ever Wanted in Notes,And Less, Collabra Sofware, Collabra Share, 2 pages, date unknown.

http://www.waria.com/databases/gwvendors.htm#Collabra Sofware Inc., Workflow And Reengineering International Association, Collabra Sofware, Inc., 1 page, date unknown.

http://www.byte.com/art-9503/sec11/art3.htm, Byte.Com Workgroup Conferencing Collabra Share, 2 pages, date unknown.

* cited by examiner

FIG. 14

Engage ThoughtWare

Home  Search  Query  Orphanage  Yellow Pages  Reports  Help

◎: 2,700 (80th%) | ⏱: 78 (67th%) | 👤: 56 (74th%)

| Domain ▽ | Search Results ▽ | Headline ▽ | Date Created ▽ | Date Last Viewed ▽ | Type ▽ |
|---|---|---|---|---|---|
| | Martin Mari... produces aggregates for the construction industry, including... | Aggregates for Highway Construction | 07/01/99 - 2:15pm | 07/01/99 - 2:15pm | Results |
| | The Gift of History Beautifully engraved Stock Certificate... | Expects lower earnings | 07/01/99 - 2:15pm | 07/01/99 - 2:15pm | Conclusion |
| | Martin Mari... expects lower earnings... | Legg Mason lowers 2001 and 2002... | 07/01/99 - 2:15pm | 07/01/99 - 2:15pm | Response |
| | Legg Mason lowers 2001 and 2002 eps... | Bendix vs Martin Marie... | 07/01/99 - 2:15pm | 07/01/99 - 2:15pm | Response |
| | Martin Man... Provider of high purity magnesium... | Martin Marie... energy systems... | 07/01/99 - 2:15pm | 07/01/99 - 2:15pm | Response |
| | Bendix vs. Martin Mari... at Amazon.com | Bendix vs Martin Marie... | 07/01/99 - 2:15pm | 07/01/99 - 2:15pm | Question |
| | Martin Mari... materials rocks! It is the #2 US producer... | But Martin Marie... failed! | 07/01/99 - 2:15pm | 07/01/99 - 2:15pm | Response |
| | Martin Mari... energy systems ORNL division job listing... | Martin Marie... rocks! | 07/01/99 - 2:15pm | 07/01/99 - 2:15pm | Response |
| | EPA Region 10 National Priorities List Deleted Site... | EPA and Martin Marie... | 07/01/99 - 2:15pm | 07/01/99 - 2:15pm | Question |

Desktops

Basic Search Criteria

Search Terms: [Martin Marietta]
Domains: [All]
Content Attributes: [All]
Traits:
Search Dates: From: [ ]  To: [ ]

Advanced Search Criteria   Hide ▲

Type Attributes: [All]
Touched Attributes: [All]
Touched Dates: From: [ ]  To: [ ]

Total Number of Search Results Found:

[Search]  [Stop Search]  [Clear]

May 01, 2002

But Martin Marietta failed !

Martin Marietta spent $3.5 Billion dollars trying to access the federal Postal Services contracts and they lost their shirt. Why do we think that we would do any better?

METHODS AND SYSTEMS FOR CREATING A VIRTUAL WORK ENVIRONMENT WITHIN WHICH TO DEVELOP IDEAS AND PERFORM INTELLECTUAL WORK

CROSS-REFERENCE TO RELATED APPLICATIONS

Priority is claimed to provisional patent application Ser. No. 60/348,311 filed Oct. 29, 2001, provisional patent application Ser. No. 60/335,261 filed Oct. 30, 2001, and provisional patent application Ser. No. 60/379,490, filed May 10, 2002, the disclosures of which are incorporated herein by this reference.

BACKGROUND OF THE INVENTION

1. The Field of the Invention

The present invention relates generally to encouraging creating of ideas and intellectual work, and more specifically relates to systems, methods, applications, and modules that create a virtual work environment where thoughts and ideas can be cultivated with a level of anonymity provided to the subscribers of the virtual work environment.

2. Background and Relevant Art

Over the years, various individuals and organizations have attempted to develop systems to encourage the development of ideas and promote intellectual work. In recent years, there has been an explosion of the importance of developing ideas and protecting the same, whether within or without an organization. Unfortunately, it is typically difficult to develop ideas within an organization because of restrictive physical work limitations commonplace to many organizations.

Currently, organizations rely upon individuals, whether alone or in small teams of groups, to develop ideas that may be beneficial to the organization. Unfortunately, this manner of creating ideas is inefficient and limits the effectiveness of each individual to develop and promote ideas within an organization. It is extremely difficult for a member of an organization without authority within the organization to promote an idea or suggestion sufficiently that it may have an effect upon the future direction of the organization. Illustratively, an individual working in a mailroom of an organization would have significant difficulty in directing an idea or suggestion for an organization to a vice president or other upper level management of the organization. More senior organization employees can stop at any time and for any reason propagation of the idea or suggestions by the mailroom employee. For instance, if the mailroom employee's supervisor dislikes the employee, he or she can simply not propagate the idea to the supervisor's superior. Alternatively, the supervisor can take ownership of the idea without providing appropriate credit to the employee that actually thought of the idea. In this latter case, the employee may refrain from expressing additional ideas because credit is not given to the conceiver of the idea. In either case, the organization is unable to harness the intelligence and creativity of many individuals, at different levels, within an organization.

The perceived intelligence or creativity applied to different individuals with different educational backgrounds and positions within an organization is also a significant hindrance to the development of ideas and performance of intellectual work within an organization. Continuing the example described above, the individual working in a mailroom may be perceived as not being as intellectual as, say, a vice president. Further, a vice president may not think that any comment or idea of the mailroom employee would have merit to him or her and/or the organization as a whole. Therefore, ideas developed by lower level employees, that may have significant benefit to an organization, are not propagated through the organization to the appropriate individuals that may encourage and subsequently implement the idea.

It would be a benefit to provide systems, methods, and modules to facilitate development of ideas and responses to posed questions within an environment where perceived outward physical attributes of an individual or the individual's position within the organization do not influence the propagation of an idea or response to a query through an organization.

BRIEF SUMMARY OF THE INVENTION

Embodiments of the present invention generally relate to systems, methods, and modules for facilitating intellectual engagement of one or more individuals associated with an organization or group of individuals or subscribers. The systems, methods, and modules of the present invention promote developing ideas and performing intellectual work and provide a mechanism for tracking the generation of such ideas or performance of intellectual work in a virtual work environment where each individual can select a level of anonymity with respect to the other subscribers within the virtual work environment. Further, the systems, methods, and modules of the present invention facilitate the comparison of ideas and intellectual work and substantially eliminate redundancy of such ideas and intellectual work to create compressed, non-redundant quantitative and qualitative data representative of such ideas and intellectual work.

Accordingly, embodiments of the present invention provide systems, methods, and modules that can include a data store for storing one or more documents associated with ideas and/or developed intellectual work. This data is accessible and may be added to through use of a subscriber module that provides an interface for subscribers of the system to communicate and engage one with another. Additionally, the subscriber module enables the subscribers to link different documents, thereby creating a chain or pedigree of multiple linked documents. This chain or pedigree of documents expands from a query document as one or more response documents are added or linked to the query document and other response documents. Each addition to the pedigree can be considered a generation of the idea or intellectual work developed from the initial query document. For instance, a document linked directly to the initial document is a first-generation document, while a document linked to this first-generation document is a second-generation document.

Generally, the present invention provides systems, methods, and modules to enable individuals within groups, optionally under the direction of a manager, to create and ask questions or queries, create responses thereto, and pose additional questions or queries. Embodiments of the present invention, therefore, provide methods, systems, and modules that provide an interactive virtual work environment where individuals, acting as subscribers to the virtual work environment, interactively cooperate in creating one or more documents containing queries or responses to queries.

An exemplary system, according to one exemplary embodiment of the present invention, enables one or more subscribers to communicate one with another and engage with one or more documents, whether personal documents or globally accessible documents. Each subscriber can access the generally available data and information within system, i.e., globally assessable documents, while personal documents are only accessible to the author and/or owner of the personal document; such personal documents being stored within a personal account of that subscriber. Depending upon the particular rights granted to each subscriber, different groups of documents are accessible for viewing and subsequently linking to one or more other documents.

The system encourages the development of one or more documents that contain posed questions or queries and/or responses thereto. The responses can include, but not limited to, other questions or queries resulting from the initial query, an answer to one or more posed questions or queries, a summary of a group of queries and responses, or another document that contains information or data relevant to the posed question or query. The interaction of subscribers can involve one or more subscribers communicating and engaging one with another through performing actions upon one or more documents.

Additionally, embodiments of the present invention facilitate tracking of each subscriber's actions with each document. For instance, the actions of subscribers with respect to each other subscriber and document created by each subscriber are tracked to identify a level of engagement of each subscriber within the virtual work environment. The system can optionally track the actions or engagement of a subscriber with respect to documents personal to the subscriber or documents that are assessable to one or more other subscribers that can use the system of the present invention. By so doing, the present invention authenticates ownership and/or authorship of ideas and intellectual work as a subscriber selects to forgo the level of anonymity chosen by the subscriber to claim authorship of one or more documents, and associated ideas and intellectual work, and obtain an appropriate real or physical world benefit.

Using the systems, methods, and modules of the present invention, a subscriber can create a query document that poses questions or issues that can be directed to one or more other subscribers selected by the subscriber having ownership to the query documents, such as a query manager.

Once the query manager has identified those other subscribers to participate in developing the idea, query, or thought contained in the query document, the system, methods, and modules of the present invention enables the query manager to extend invitations to the selected group of subscribers. Using the communication facilitated by the system, methods, and modules of the present invention, the invited subscribers and optionally one or more non-invited subscribers can collaborate and create response documents in light of the query document and other response documents created by the subscribers participating in developing the idea and/or performing intellectual work.

The methods, systems, and modules of the present invention provide various graphical representations of the documents and the links there between. The graphical representations provide a navigable interface for use by the subscribers to view documents and participate in developing ideas and performing intellectual work.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 14 illustrates yet another exemplary embodiment of a user interface for enabling a subscriber to use the exemplary embodiment of the present invention depicted in FIG. 2;

DETAILED DESCRIPTION OF THE PREFERRED EMBODIMENTS

The present invention extends to systems, methods, and modules for facilitating communication between individuals within a business organization or other group of individuals. The systems, methods, and modules of the present invention are adapted to enable individuals to work effectively to develop ideas and perform intellectual work in an environment where each individual or subscriber can select a level of anonymity with which to participate or engage in the development of the ideas and performance of intellectual work. Intellectual work includes developing ideas, responding to queries posed by one or more subscribers, creating queries and questions, and generally performing actions with respect to one or more documents. Further, embodiments of the present invention facilitate tracking the actions of each subscriber or individual as he or she creates documents, links one or more documents, and generally interacts with one or more documents containing data or information related to one or more ideas developed by one or more subscribers. The performance of actions related to one or more documents and/or one or more subscribers can be considered as participating or engaging with the same and/or developing ideas and performing intellectual work. Embodiments of the present invention may include a special purpose or general-purpose computer including computer hardware.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions include, for example, instructions and data which cause a general purpose computer, special purpose computer, or special purpose processing device to perform a certain function or group of functions.

Figure 1:
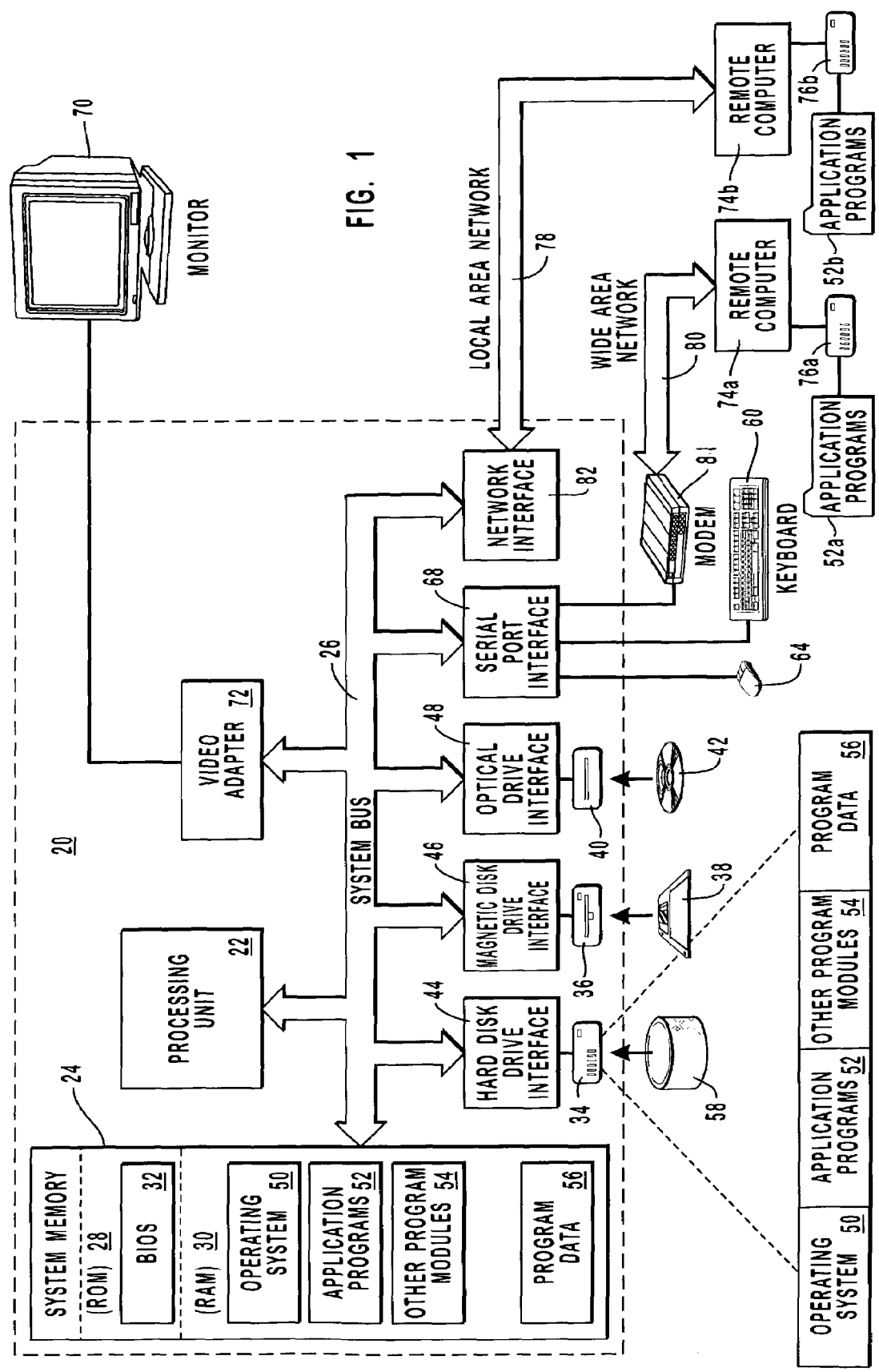
FIG. 1 illustrates one exemplary environment within which an embodiment of the present invention can be embodied.

FIG. 1 and the following discussion are intended to provide a brief, general description of a suitable computing environment in which the invention may be implemented. Although not required, the invention will be described in the general context of computer-executable instructions, such as program modules, being executed by computers or hardware devices in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and other hardware devices. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general-purpose computing device in the form of a conventional computer 20, including a processing unit 22, a system memory 24, and a system bus 26 that couples various system components including the system memory 24 to the processing unit 22. The system bus 26 may be any of several types of bus structures including a memory bus or memory controller, a peripheral bus, and a local bus using any of a variety of bus architectures. The system memory includes read only memory (ROM) 28 and random access memory (RAM) 30. A basic input/output system (BIOS) 32, containing the basic routines that help transfer information between elements within computer 20, such as during start-up, may be stored in ROM 28.

The computer 20 may also include a magnetic hard disk drive 34 for reading from and writing to a magnetic hard disk 58, a magnetic disk drive 36 for reading from or writing to a removable magnetic disk 38, and an optical disk drive 40 for reading from or writing to removable optical disk 42 such as a CD-ROM or other optical media. The magnetic hard disk drive 34, magnetic disk drive 36, and optical disk drive 40 are connected to the system bus 26 by a hard disk drive interface 44, a magnetic disk drive-interface 46, and an optical drive interface 48, respectively. The drives and their associated computer-readable media provide nonvolatile storage of computer-executable instructions, data structures, program modules and other data for the computer 20. Although the exemplary environment described herein employs a magnetic hard disk 58, a removable magnetic disk 38 and a removable optical disk 42, other types of computer readable media for storing data can be used, including magnetic cassettes, flash memory cards, digital versatile disks, Bernoulli cartridges, RAMs, ROMs, and other media capable of storing data.

Program code means comprising one or more program modules may be stored on the hard disk 58, magnetic disk 38, optical disk 42, ROM 28 or RAM 30, including an operating system 50, one or more application programs 52, other program modules 54, and program data 56. A user may enter commands and information into computer 20 through keyboard 60, pointing device 64, or other input devices (not shown), such as a microphone, joy stick, game pad, satellite dish, scanner, or other device capable of being used to input data into computer 20. These and other input devices are often connected to the processing unit 22 through a serial port interface 68 coupled to system bus 26. Alternatively, the input devices may be connected by other interfaces, such as a parallel port, a game port or a universal serial bus (USB). A monitor 70 or another display device is also connected to system bus 26 via an interface, such as video adapter 72. In addition to the monitor, personal computers typically include other peripheral output devices (not shown), such as speakers, printers, scanners, copiers, facsimile machines, etc.

The computer 20 may operate in a networked environment using logical connections to one or more remote computers, such as remote computers 74a and 74b. Remote computers 74a and 74b may each be another personal computer, a server, a router, a network PC, a peer device or other common network node, and typically include many or all of the elements described above relative to computer 20, although only memory storage devices 76a and 76b and their associated application programs 52a and 52b have been illustrated in FIG. 1. The logical connections depicted in FIG. 1 include a local area network (LAN) 78 and a wide area network (WAN) 80 that are presented here by way of example and not limitation. Such networking environments are commonplace in office-wide or enterprise-wide computer networks, intranets and the Internet.

When used in a LAN networking environment, computer 20 is connected to local network 78 through a network interface or adapter 82. When used in a WAN networking environment, computer 20 may include a modem 84, a wireless link, or other means for establishing communications over wide area network 80, such as the Internet. The modem 84, which may be internal or external, is connected to system bus 26 via serial port interface 68. In a networked environment, program modules depicted relative to computer 20, or portions thereof, may be stored in the remote memory storage device. It will be appreciated that the network connections shown are exemplary and other means of establishing communications over wide area network 80 may be used.

Generally, the present invention provides systems, methods, and modules to accelerate the rate at which individuals within groups, optionally under the direction of a manager, create and ask questions or queries, create responses thereto, and pose additional questions or queries. Embodiments of the present invention, therefore, provide methods, systems, and modules that provide an interactive virtual work environment where individuals, acting as subscribers to the virtual work environment, interactively cooperate in creating one or more documents containing queries or responses to queries. These subscribers cooperate one with another with a level of anonymity, with respect to other subscribers of the virtual work environment, selected by each individual subscriber.

Generally, each subscriber can be considered as any individual that accesses the virtual work environment associated with the present invention. The identity of a subscriber can be completely secret, selectively secret, or public to other subscribers of the virtual work environment, thereby providing each subscriber with a choice of the level of anonymity desired by the subscriber. By so doing, the methods, systems and devices of the present invention create a virtual work environment, operating in parallel with the physical workplace, where the multiple facets of human behavior and ethics are balanced through use of technology. By so doing, the virtual work environment promotes intellectual work, while channeling the intellectual work towards organizational beneficial purposes.

Through use of selective anonymity and the systems, methods, and modules of the present invention, physical world restrictions preventing individuals or subscribers from participating in developing ideas and performing intellectual work with other subscribers, i.e., engaging with documents containing queries and responses to queries, are eliminated.

For instance, by enabling each subscriber to communicate with one another and to create documents in anonymity, the limitations associated with lack of real-world authority are eliminated. Similarly, other real world or physical world restrictions to providing ideas and intellectual work are removed due the selective anonymity provided by the systems, methods, and modules of the present invention.

An exemplary system 200, according to one exemplary embodiment of the present invention, provides a system for one or more subscribers to communicate one with another and engage with one or more documents. These documents can be accessible to different subscribers based differently defined levels of security and authorization. For instance, some documents are personal documents that are only accessible to a specific subscriber; other documents are accessible to any subscriber such as globally accessible document, while still other documents are accessible to a select group of the subscribers using the virtual work environment. Consequently, each subscriber can access those documents to which the subscriber has appropriate access rights to access. Therefore, depending upon the particular rights granted to each subscriber, different groups of documents are accessible for viewing and subsequently linking to one or more other documents.

Each subscriber utilizing system 200 need not be an employee of an organization providing the virtual work environment; rather each subscriber need only have sufficient access rights to access the virtual work environment provided by the system, methods, and modules of the present invention. Consequently, each subscriber can be an employee, independent contractor, affiliate member, or any other individual that is affiliated or associated with an organization wishing to benefit from the creation of a virtual environment where intellectual work is promoted and tracked.

The system 200 encourages the development of one or more documents that contain posed questions or queries and/or responses thereto, where such responses may be another question, an answer to the posed question or query, a summary of a group of queries and responses, or another document that contains information or data relevant to the posed question. The interaction of subscribers can involve one or more subscribers communicating and engaging one with another through performing actions upon one or more documents. These actions can include, but are not limited to, accessing a document, modifying a document, annotating a document, making a quantitative evaluation of a document, making a qualitative evaluation of a document, assigning document traits to a document, creating another document, linking one or more documents, adding an attachment to a document, forwarding a document, connecting one or more documents, deleting a document, identifying a document as a favorite, contacting an author of a document, searching for one or more subscribers, search for one or more documents, search within a document, and search document traits associated with a document, or any other measurable or trackable actions performed by a subscriber to a document.

Additionally, embodiments of the present invention can facilitate tracking of each subscriber's actions with each document. For instance, the actions of subscribers with respect to each other subscriber and document created by each subscriber are tracked to identify a level of participation or engagement of each subscriber within the virtual work environment. Optionally, the system tracks the actions or engagement of a subscriber with respect to documents personal to the subscriber or documents that are assessable to one or more other subscribers that can use the system of the present invention. By so doing, the present invention authenticates ownership and/or authorship of ideas and intellectual work as a subscriber select to forgo the level of anonymity chosen by the subscriber to claim authorship of one or more documents, and associated ideas and intellectual work, and obtain an appropriate real or physical world benefit.

Figure 2:
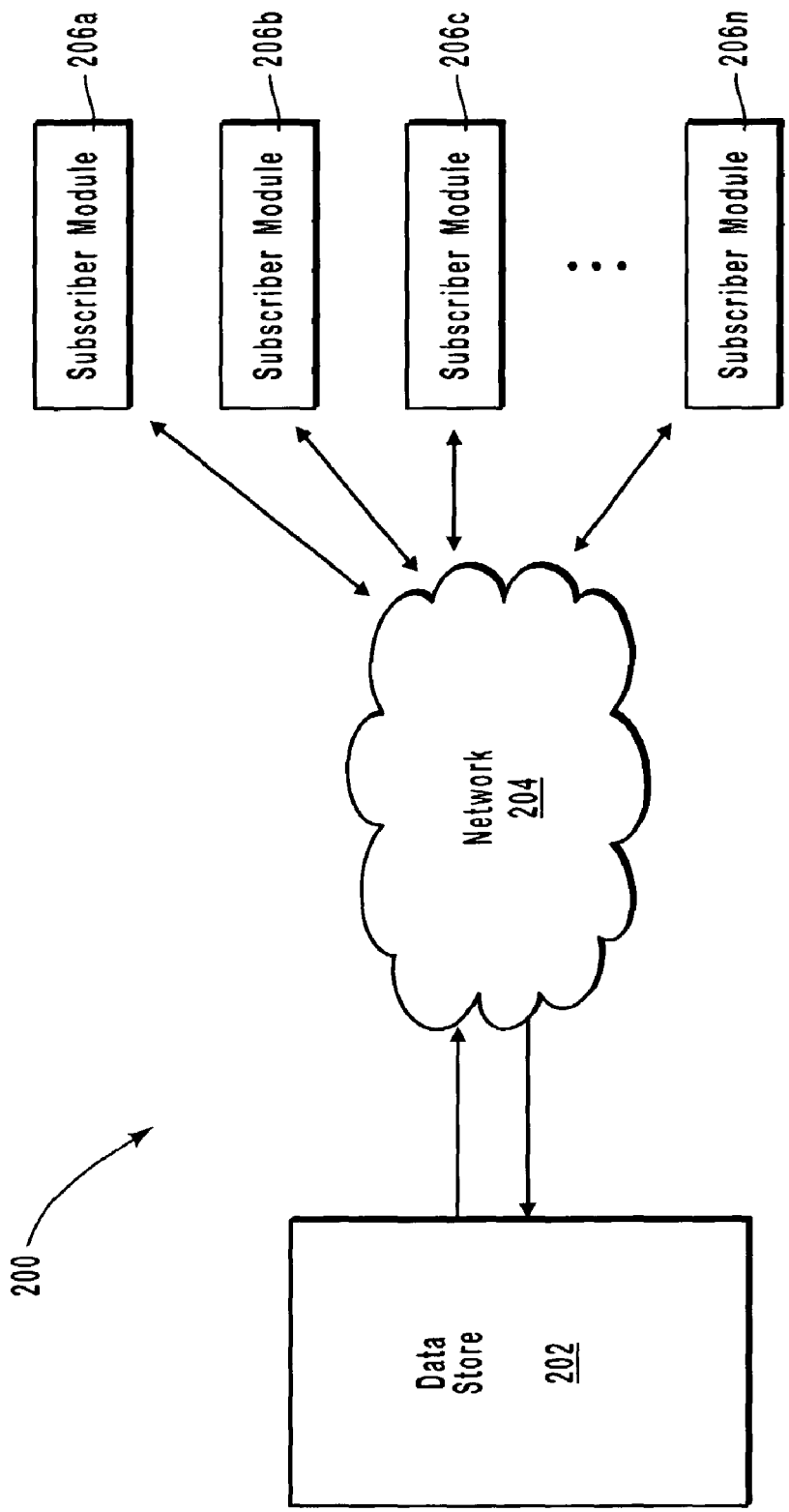
FIG. 2 illustrates a schematic representation of one exemplary system of the present invention.

FIG. 2 is a block diagram illustrating an exemplary system implementing one embodiment of the present invention. As shown, system 200 includes one or more data stores 202, only one being shown, that communicates with one or more subscriber modules 206a–206n via a network 204. Data store 202 is adapted to store information and data related to the virtual work environment and the actions of one or more subscribers using subscriber modules 206a–206n to access the virtual work environment. For instance, data store 202 can store one or more documents of a variety of types, whether available for viewing by any subscriber accessing data store 202 using one or more of subscriber modules 206a–206n or personal to a specific subscriber.

Figure 3:
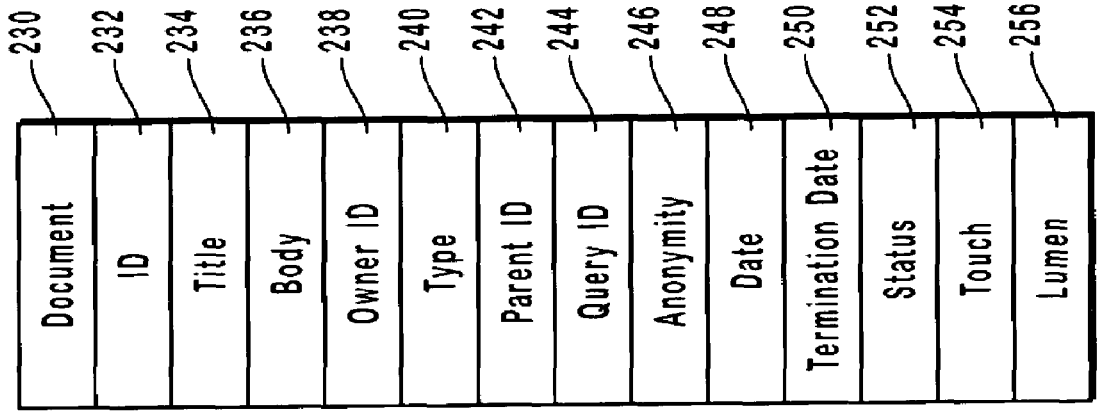
FIG. 3 illustrates a schematic representation of a document data structure of the invention depicted in FIG. 2 according to one exemplary embodiment of the present invention.

With reference to FIG. 3, which schematically depicts illustrative data associated with a document storable in data store 202, a document 230 can include data associated with a posed query or response thereto, whether or not the response to the query is itself a query. As discussed herein, each document is either a query document or a response document, where the response document is any type of document that can be associated with a query document. For instance, and not by way of limitation, each other document can be (i) a response to a query document, (ii) a question posed in light of the query contained in the query document or a response to the query document, (iii) a post-conclusion comment related to the query document, (iv) a query conclusion document, (v) a summary of various parent-child documents, (vi) a document summarizing a generation of documents, (vii) a personal document, or (viii) a document having no assigned or designed query manager, i.e., a subscriber having real-world authority to initiate a query. Additional information regarding these different documents will be provided hereinafter, however, all documents stored in data store 202 (FIG. 2) are either a query document or a response document, the later including document types (i)–(viii) with the understanding that documents (i)–(viii) can optionally include additional queries or implied queries related to the query document.

Associated with each document are one or more data fields 232–256 that define characteristics and/or properties of a document, such as document 230. These data fields 232–256 uniquely define each document and provide a mechanism through which one or more subscribers can link more or one documents to create a chain or pedigree of documents that represent the flow or development of an idea. This chain or pedigree of documents grows as different subscribers add documents based upon each subscriber's suggestions and ideas during performing the intellectual work. The chain or pedigree represents the manner by which the idea or intellectual work develops over time and illustrates the contributions by each subscriber acting with a level anonymity relative to the other subscribers of the virtual work environment.

Although reference is made to each document including one or more data fields associated therewith, it can be appreciated by one skilled in the art that the document can include a greater or lesser number of data fields, whether or not such data fields include all or some of those described herein.

As depicted, a document 230 can include an identifier or a data field containing data representative of an identifier, as represented by number 232. Each identifier 232 uniquely defines the document with which it is associated. In this manner, each document 230 is uniquely defined and searchable by data store 202 (FIG. 2) and/or one or more subscribers using subscriber modules 206a–206n.

In addition to document 230 including identifier 232, document 230 can include data representative of the name of document 230, as represented by title data 234, and data representative of the main text of document 230, as represented by body data 236. In one configuration, title data 234 is limited to an expression of ten or less words to facilitate capsulation of the query or response thereto. Optionally, title data 234 can allow a subscriber to input a number of words greater or lesser than 10 words or define a maximum number of characters for the title included in title data 234.

In many instances, decisions related to a particular document delivered to a subscriber may be based upon this title. By limiting the number of characters or the number of words for the title, each subscriber is assisted in focusing the query or response thereto represented by each document. In this manner, embodiments of the present invention facilitate development of focused thoughts or ideas associated with a posed query and/or the one or more responses thereto.

Similarly, body data 236 can have a limited number of words, such as but not limited to, 50 words or less that defines the one or more concepts expressed in title data 234. Optionally, body data 236 can allow a subscriber to input a number of words greater or lesser than 50 words. In still another embodiment, body data 236 is limited to a maximum number of characters rather than limited to a maximum number of words.

In addition to defining the title and body of document 230, data representative of the owner or author of the document can be associated with document 230, as represented by owner data 238. By affiliating each document with a specific author, system 200 tracks the actions performed on each document and the number of documents created by each author. In this manner, system 200 can be used to track the engagement of each subscriber in developing ideas and performing intellectual work.

As mentioned above, a variety of different documents can be stored in data store 202 (FIG. 2). Each type of document can be identified through type data 240. The functions of each document or type of document are varied and the use of these different types of document provides structures within which queries are posed to one or more subscribers using subscriber modules 206a–206n (FIG. 2). Additionally, these documents allow responses or addition queries to be provided and one or more subscribers to generate summaries of the resultant outcome of a chain or pedigree of related documents. For instance, a query document stored in data store 202 (FIG. 2) is a document that contains the initial or originating query posed by a subscriber to one or more other subscribers. To respond to the posed query, a subscriber can use a response document within which the subscriber can answer the query, provide additional insight to the query posed in the query document, or provide additional queries. Similarly, even though a query may have been terminated, a subscriber can associate or link data or information to a query document or another document through use of a post-conclusion comment document.

In the event that a subscriber selects to pose additional questions related to a query contained in a query document, a question document enables the subscriber to perform such a function or action. For instance, a subscriber through subscriber module 206a–206n (FIG. 2) can pose additional follow-up questions, comments, or queries using a question document.

When a query has terminated, one or more subscribers can create a query conclusion document that provides a summary of the responses to the posed query. Further, one or more subscribers, such as but not limited to a query manager responsible for the query included in the query document can create one or more parent summary documents, each of which summarizes all documents that may be spawned from the initial query document. Additionally, one or more subscribers can create one or more generation documents, each of which summarizes all parent summary documents for a particular generation of the originating query. By so doing, embodiments of the present invention facilitate compression of data. Through one or more subscribers summarizing the results associated with a posed query, compressed data is generated using the intellect and knowledge of one or more subscribers that can identify nuances that a computer may not identify.

In addition to the above, data store 202 can store one or more personal documents, one or more global documents, and/or one or more documents accessible to a select number of the subscribers accessing or using the virtual work environment. Each personal document is accessible only to a specific subscriber and is not promulgated throughout the virtual workspace environment, i.e., no global access to the personal document. These personal documents are only visible to an originator or author of the document. An orphan document, in contrast, is a document containing a query that has not been sponsored by a subscriber or does not have a query manager associated therewith. These query documents are available for adoption by subscribers at their leisure and can be viewed by one or more subscribers.

To aid with linking documents stored within data store 202, each document can include a parent data field 242 that indicates a parent document to which the particular document relates. The data stored within parent data field 242 can include the parent document's unique identifier, i.e., identifier 232. Alternatively, some other identifier can be used to uniquely link parent and child documents. Furthermore, each document can include a query ID 244 that uniquely identifies the query document to which the document is associated. For instance, query ID 244 can include the unique identifier of the query document to which the document relates, whether directly or indirectly through a number of intermediate documents disposed between the query document and the document to be linked thereto.

In addition to the above, each document can include anonymity data 246. The anonymity data 246 defines the level of anonymity of the author-subscriber of the document. The author can select to remain anonymous for certain documents he or she authors, while being public with other documents he or she authors. In this manner, each author of a document, whether a query document or response document, can select the level of anonymity the author desires.

To aid in tracking the progress of an idea or intellectual work within an organization, each document can have associated therewith date data 248. The date data identifies the date when the document was created. Similarly, each query document can include termination date data 250 that indicates when a query is to terminate. For instance, a query manager for a query document may desire responses to the query by a certain date based upon real or physical world constraints. By setting a termination date, each subscriber capable of viewing the query document and associated chain and/or pedigree of response documents can identify the latest date by when he or she can add his or her response document and participate in developing ideas and performing intellectual work.

Related thereto, a document can include status data 252 that contains data representative of the status of the document as being open or closed, i.e., terminated. Further, status data 252 can include a value of adopted to indicate that the document was adopted by a manager having sufficient organizational authority to initiate queries and has selected a document that was available for adoption, as will be discussed in greater detail hereinafter.

To further track the actions performed or related to each document, each document can include touch data 254. Touch data 254 contains data representative of each subscriber that accessed or performed an action related to the document, i.e., engaged with the document. For instance, the data can store information regarding the date when a subscriber performed an action related to the document and what action the subscriber performed.

Additionally, each document can include lumen data 256. Lumen data 256 defines or indicates a score or rating for a particular document. As will be discussed in greater detail hereinafter, each subscriber can score or create a scoring for a document based upon that subscriber's perception of the document and the information and/or data contained therein. The cumulative scoring of the document results in a rating value that can be stored or associated by linking to lumen data 256. By reviewing the scorings and ratings for each document and associated query, subscribers can identify those documents and queries that are perceived to be beneficial to the organization.

Each document optionally can include data related to reminder data that indicates a date when the owner of the document is to be reminded that the document is in the subscriber's personal account or a globally accessible account. Further, each document optionally can include data related to a date when the document was adopted and/or the query ID of a document with which an adopted document was associated and a personal ID associated with a copy of a document that was a globally accessible document stored in a personal account of the subscriber.

Generally, data store 202 can include one or more databases having one of a variety of different architectures to store the documents and other data associated with the subscriber. For instance, data store 202 or the one or more databases associated or communicating with data store 202 can have a relational architecture, a network architecture, a flat architecture, a hierarchical architecture, an XML architecture, an object orientated architecture, or other architectures known to one skilled in the art.

Returning to FIG. 2, facilitating communication between data store 202 and subscriber modules 206a–206n is network 204. Network 204 may be a local area network (LAN), a wide area network (WAN), a wireless network, or one of a variety of other networks known by one skilled in the art. Data store 202 communicates with network 204 via various types of communication connections, such as but not limited to, cable or cable modems, satellite, telephone lines, whether analog or digitally based, the Internet, DSL, G-Lite, wireless technology, infra-red (IR) technology, high-speed data connections, or any other suitable transmission technology or medium. One skilled in the art may identify various other types of network and/or communication connections that are capable of performing the desired function of allowing data store 202 to communicate with subscriber modules 206a–206n.

In communication with data store 202 are one or more subscriber modules 206a–206n, which optionally communicate one with another through an additional network (not shown). Each subscriber module 206a–206n functions as a portal through which a subscriber can access data store 202. For instance, each subscriber module 206a–206n can function or act as a portal to the Internet, intranet, or other network connection or portal, whether such portal is private or public, to enable each subscriber to access the data or information stored in data store 202. In one configuration, this portal is accessible only to those subscribers associated with a specific organization, such that a virtual work environment is established and operated exclusively for the benefit of a particular organization for which the subscribers are working. Optionally, this portal can be hosted or otherwise controlled by a business organization utilizing the inventive system, methods, and modules or some other third party that facilitates access to the portal, such as a third-party application service provider (ASP). Although one embodiment utilizes a third-party ASP capable of hosting modules or applications associated with the present invention, it is conceivable and understood by one skilled in the art that such modules or applications need not be hosted by a third-party but may optionally be hosted by the same organization for which the user or subscriber is using the portal.

While the portal may offer a variety of services to those granted access therethrough, the portal promotes the frequent and robust use of the virtual work environment to generate or perform intellectual work. By using the organization's portal, i.e., each subscriber module 206a–206, either alone or in combination with network 204 and/or data store 202, to promote intellectual engagement, the portal acts as a highly beneficial reinforcer, and manifests the strength of the organization's commitment to the intellectual engagement or intellectual work through use of the portal.

Those skilled in the art will appreciate that each subscriber module 206a–206n can have the form of a personal computer, a hand-held device, a multi-processor system, a personal digital assistant, a microprocessor-based or programmable consumer electronic device, a telephone, a pager, a pocket PC, a network PC, a minicomputer, a mainframe computer, combination thereof, or other electronic device that is capable of enabling a subscriber to access data store 202 therethrough. Generally, therefore, each subscriber module 206a–206n may include the structure and functionality of computer 20 (FIG. 1) with associated application programs 52 and memory 24 to store application programs 52, data, and information. Optionally, each subscriber module 206a–206n can include less than all structures and perform less than all functions of computer 20. For instance, each subscriber module 206a–206n can be configured to display an interface to a subscriber to initiate functionality of system 200, while processing to achieve some or all of the functionality of system 200 is substantially performed at data store 202, partially performed at data store 202 and subscriber module 206, or substantially performed at subscriber module 206.

Generally, data store 202 and each subscriber module 206a–206n can communicate one with another continuously, substantially continuous, periodically, sporadically, or combinations thereof, to transfer data therebetween. The function of either transmitting data and/or receiving data, in various forms and types, will be termed collectively as "transceiving." Therefore, data store 202 and each subscriber module 206a–206n transceive data between each other.

Figure 4:
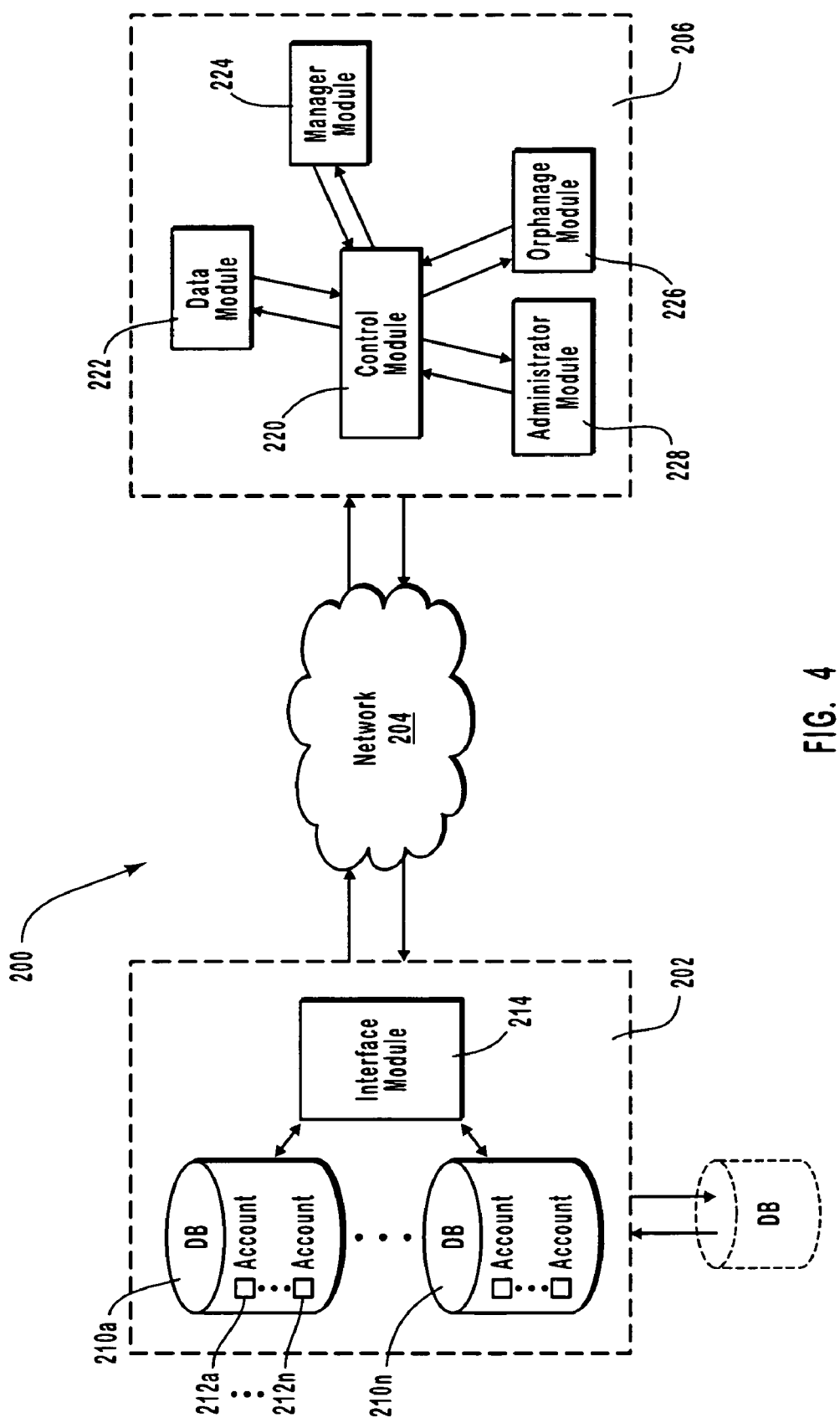
FIG. 4 illustrates a more detailed schematic representation of one exemplary system of the present invention depicted in FIG. 2.

Referring now to FIG. 4, depicted is a more detailed schematic representation of system 200 capable of facilitating intellectual work. As described above, system 200 includes data store 202 that communicates with subscriber modules 206a–206n through network 204. In this schematic representation, only one subscriber module 206 is depicted. The following discussion will be directed to communication of a single data store to a single subscriber module. One skilled in the art, however, can understand that a similar discussion can be made for communication between one or more data stores and one or more subscriber modules.

As illustrated, data store 202 includes one or more databases 210a–210n that store the data representative of the intellectual work, such as but not limited to, ideas, inventions, questions, answers, queries, documents, scorings of documents, conclusions, summaries, results of queries, which are created or performed using system 200. The databases 210a–210n can have various architectures, such as those described with respect to data store 202 herein. Optionally, data store 202 can access one or more remote databases, such as a database illustrated in dotted lines. In this way, data store 202 can retrieve data associated with the virtual work environment that may be stored in various locations. Consequently, data store 202 can communicate using various communication connections with one or more remote data stores.

The data stored in databases 210a–210n can be organized in a variety of different manners so long as the data is accessible to one or more subscribers through subscriber modules 206a–206n and manipulatable by subscribers having appropriate access rights. In one configuration, data store 202 includes one or more subscriber accounts 212a–212n, each account being associated with a subscriber of system 200. Although this is the case in this exemplary configuration, one skilled in the art can understand that each account can be associated with one or more subscribers and each subscriber can have or be associated with one or more accounts.

Within accounts 212a–212n, a subscriber can store information and data personal to the subscriber. The subscriber can store personal documents and copies of documents available globally within system 200 within or otherwise associate the same with the subscriber using accounts 212a–212n. Furthermore, each subscriber account 212a–212n can include data or information specific to the subscriber or include data representative of one or more links that associate such data to a particular subscriber.

Illustratively, data store 202 can store data or information associated with each subscriber, such as but not limited to, the subscriber's name, email address, affiliated department, employment title, telephone number, userID, password, educational background, certificates or awards, responsibilities, work experience, career interests, and other information specific to the subscriber as can be understood by the description contained herein.

Other information associated with each subscriber can be stored within data store 202. The other data or information can define different characteristics or attributes of each subscriber and enable tracking of the subscriber's interaction with other subscribers within the virtual work environment. For instance, in one configuration, each account 212a–212n can include data indicative of a level of anonymity selected by a subscriber. As discussed previously, system 200 enables each subscriber to select a level of anonymity with respect to documents created by each subscriber. Therefore, each subscriber can select to remain anonymous to other subscribers with the virtual work environment but still respond to query documents and otherwise engage or perform actions related to query documents and response documents.

Each subscriber can select to keep his or her identify completely secret, selectively secret, or public to other subscribers of the virtual work environment. Through this process, system 200 provides a mechanism by which subscribers can participate in developing ideas and performing intellectual work without the actual or perceived restrictions associated with the physical world, such as lack of organizational authority, physical deformities, perceived lack of intellectual prowess, perceived lack of educational background, or other physical world limitations. Since each subscriber can remain anonymous all documents, and the queries or responses contained therein, are analyzed based upon the text, graphics, audio, and/or video media associated with the document. Therefore, the ideas and intellectual work are developed only for the idea and intellectual work and not for ulterior motives of one or more subscribers.

In addition to the above, data storage 202 can store data that facilitates engagement of different subscribers with documents and hence one another. To facilitate communication between one or more subscribers and to allow a subscriber to control the number and type of documents received from other subscribers, data store 202 can maintain a listing of certain filters or filter data that govern which documents a particular subscriber receives. These filters limit superfluous documents, as perceived by a subscriber, from being received by the subscriber. The filters associated with each subscriber can be based on a variety of different criteria.

In one configuration, the filter data can limit the delivery of documents based upon a maximum number of query document and/or response documents currently received by a subscriber. Therefore, when system 200 identifies that a subscriber has received a maximum number of query document and/or response documents, all subsequent documents received by the subscriber will be returned to the originating author or subscriber delivering the same to the filtered subscriber. Another filter could limit delivery of query documents or invitations to participate with a query contained in a query document based upon the number of queries with which the subscriber is currently participating. Therefore, in a similar way to that described above, when additional query documents or invitations to a query are received while the subscriber is engaging with his predetermined maximum number of queries, the query document or invitation to participate in a query will be returned to appropriate subscriber.

In still another configuration, the filter(s) may automatically return any document, whether query document or response document, received within a particular date. The subscriber can designate a start date and a stop date within which all received documents would be returned to the sending subscriber. In another configuration, the filters may prevent delivery of any document based upon other subscriber invitees associated with the document, i.e., based upon the other subscribers to which the document is to be sent. In this manner, the subscriber can choose to participate or engage in a query with those subscribers for which they want to work.

In still another configuration, the filter(s) may prevent delivery of documents that have certain traits or characteristics. Since each document can include one or more traits identifying the purpose or importance of the query with respect to different areas of an organization, a subscriber can limit received documents to those documents having traits or characteristics associated with specific organizational areas of the business. For instance, the filter may allow delivery of only those documents that have traits related to increasing productivity, decreasing costs, increasing sales, or related to new technology of the organization. Unless a document includes one or more of theses traits, the filter will prevent delivery of the document to the subscriber. Depending upon the configuration of the present invention, a subscriber can require each document to include all selected traits or one or more selected traits.

Although reference has been made to various filters that can be designed by a subscriber, one skilled in the art can appreciate that various other filters can be identified and any combination thereof can be used to control delivery of documents to a subscriber.

In addition to the above, data store 202 can include information or data that defines different query documents a subscriber will receive. For instance, a subscriber may select to receive notification when a document is placed in the orphanage, as will be discussed in more detail hereinafter. In this manner, a subscriber, such as a query manager, can review newly included query documents and choose to adopt the query document.

Further, a subscriber can designate a minimum number of subscribers that must associate themselves with a document, such as a query document, before a subscriber will receive a query document that may fit within certain parameters or filters defined by a subscriber. Alternatively, a subscriber can designate a minimum number of points associated with a query document and/or the cumulative number of points associated with one or more chains or limbs of the pedigree associated with the query document that must be achieved before the subscriber will receive the query document and the appropriate response documents related thereto. In this way, a subscriber can, again, limit the number of documents received by the subscriber.

Additionally, data store 202 can include data or other information related to a particular role of a subscriber within system 200. Each subscriber can have a variety of roles within system 200 to facilitate developing ideas and performing intellectual work. For instance, each subscriber can be a subscriber, with associated access rights to various portions of system 200. Additionally, each subscriber can also be a query manager that has rights to create query documents and invite one or more other subscribers to develop ideas and perform intellectual work. Those subscribers that are selected to engage with the query document initiated by a query manager can be identified as a participant to a query. In this manner, a participant is identified as a subscriber that is engaging or performing actions related to a query contained within a query document initiated by a query manager.

A subscriber can also be identified as a system administrator that has certain access rights to perform different functions commonly associated with a system administrator. For instance, the system administrator can identify access rights, identify roles of subscribers, track the actions of subscribers within system 200, authenticate authorship of documents upon removal of anonymity, perform subscriber management functions, query management functions, and system management functions using appropriate hardware and/or software modules as described herein, and various other functions. Additionally, a subscriber can also be a sponsor that introduces and enrolls other subscribers.

In order to facilitate the transfer of ideas and tracking of the same, embodiments of the present invention provide methods, systems, and modules that track the activities or actions of each subscriber with respect to documents that contain or encapsulate, in a textual or graphical format, ideas developed or to be developed within the organization. These ideas represented by posed queries and responses thereto, can be linked together through the methods, systems and modules of the present invention to form a chain or a web of thoughts and ideas.

During the interaction of the subscribers within the virtual work environment, each subscriber can generate merit points based upon the subscriber's actions. The total merit points generated by a subscriber can be stored in data store 202. The number of merit points represents the level of participation or engagement of a subscriber with respect to other subscribers and associated documents. A subscriber with a low number of points is not as engaged as a subscriber with a high number of points. Points are generated as a subscriber accesses the virtual work environment and performs actions relating to one or more documents. Various actions of the subscriber can generate points. For instance, a non-exhaustive list can include, but not limited to, accessing a document, modifying a document, annotating a document, making a qualitative evaluation of a document, making a quantitative evaluation of a document, assigning document traits, creating one or more documents, linking one or more documents, adding an attachment to one or more documents, forwarding one or more documents, connecting one or more documents to additional documents, deleting one or more documents, identifying a document or one or more documents as favorites, contacting an author of a document, searching for one or more subscribers, searching for one or more documents, searching within a document, searching one or more document traits, and various other actions from the teaching contained herein.

In addition to generating points, each subscriber can loose points or use points to further the subscriber's ideas, such as contained in one or more query documents and/or response documents. In this manner, a subscriber can participate in the virtual work environment, generate ideas and comments, and further specific projects, questions, thoughts, and ideas of the subscriber based upon the number of points generated through the subscriber's prior actions within the virtual work environment.

In the event that a subscriber looses a sufficient number of points to drop below a threshold level, the subscriber may be prevented from participating or engaging with other subscribers and documents. In this way, a subscriber can be actively engaged with the system or be prevented from accessing the system by a system administrator due to the lack of points.

Referring again to FIG. 2, databases 210a–210n communicate with network 204 through interface module 214. Interface module 21 provides a communication interface between data store 202 and subscriber module 206. The interface module 21 controls the delivery of data transmitted to and received from subscriber module 206. The process of transmitting data and receiving data is termed "transceiving."

Referring again to FIG. 4, communicating with data store 202 and the data stored therein is subscriber module 206. Subscriber module 206 can include a control module 220 that functions to perform or control the performance of certain functionality initiated through manipulation of a user interface by the subscriber using subscriber module 206. Control module 220 can control the delivery of data to and from data store 202 based upon requests made by the subscriber through selecting icons included in the user interface, such as the interface depicted in FIGS. 9–15.

Further associated with subscriber module 206 are various other modules that are adapted to facilitate involvement of a subscriber within the virtual work environment. As depicted, subscriber module 206 includes a data module 222 that can store data or portions of data related to the subscriber and the subscriber's personal account. The data stored within data module 222 can be a subset of the data stored at data store 202 that facilitates efficient processing of the data and limits the need for subscriber module 206 to continually communicate with data store 202 via network 204. In this manner, subscriber module 206 can function independently from data store 202 and subsequently update data store 202 upon subscriber module 206 reconnecting with data store 202. Although subscriber module 206 is illustrated as including data module 222, it can be understood by one skilled in the art, that subscriber module 206 can communicate with a remote data module 222 that is remote from subscriber module 206. Further, it can be appreciated that in other configurations subscriber module 206 remains in communication with data store 202 as a subscriber engages with or participates in developing ideas and performing intellectual work.

Figure 5:
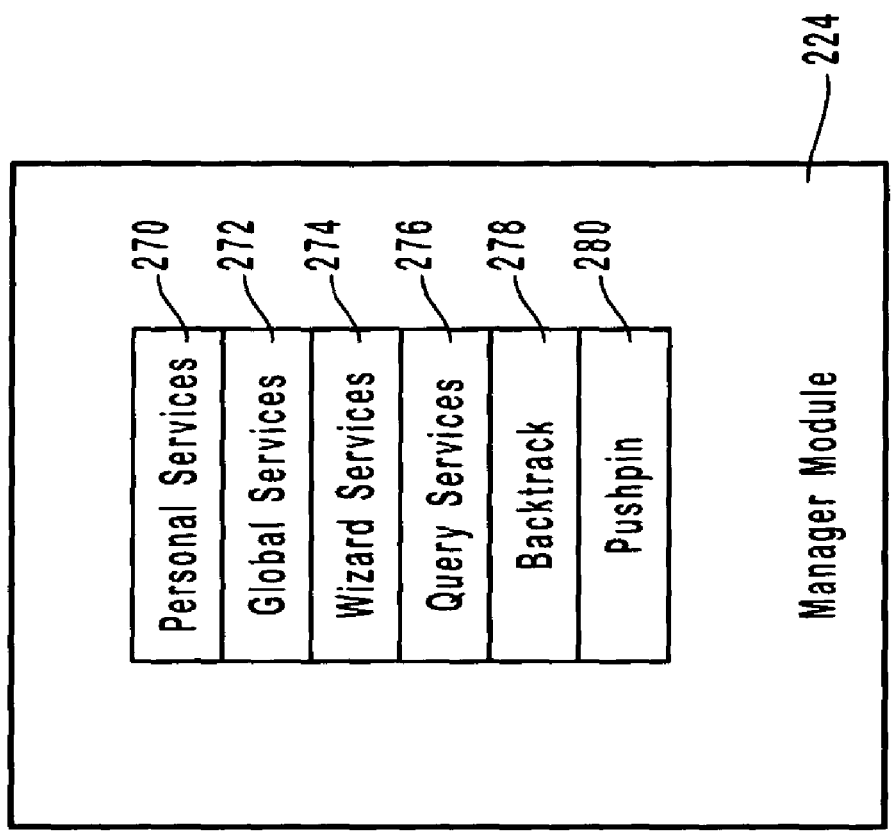
FIG. 5 illustrates a schematic representation of a manager module of the exemplary embodiment of the present invention depicted in FIG. 2.

In addition to data module 222, subscriber module 206 can include a manager module 224. Manager module 224 is adapted to provide the functionality associated with various services and wizards that form part of the present invention. With respect to FIG. 5, manager module 224 can include various services and wizards, such as but not limited to personal services module 270, global services module 272, wizards services module 274, query services module 276, backtrack module 278, and pushpin module 280. Each of these modules 270–280 can optionally be included within subscriber module 206 of the present invention. Therefore, it can be understood, that one or more of modules 270–280 can be eliminated from or incorporated within other modules of the present invention.

Personal services module 270 is adapted to provide functionality relating to the personal documents maintained in the subscriber's account. Personal services module 270 is adapted to provide or enable a subscriber to copy personal documents into the global document environment so that the documents are accessible by one or more additional subscribers. Furthermore, personal services module 270 is adapted to send personal documents to an orphanage of documents, i.e., orphanage module 226 (FIG. 4) so that one or more additional subscribers can adopt the document. Additionally, personal services module 270 facilitates sending personal documents to other subscribers, moving personal documents to the global environment as a new query document, deleting personal documents, archiving personal documents, creating personal documents, or performing various other functions related thereto. It can be understood by one skilled in the art that the module can perform various functions in various ways.

Global services module 272 can perform similar functions to personal services module 270. For instance, global services module 272 is adapted to copy a global document to a subscriber account of the subscriber, enable and disable posting of global documents on a subscriber's homepage, sending global documents to another subscriber, or other similar actions.

Wizard services module 274 generates wizards to guide subscribers in performance of the various functions associated with the systems, methods, and modules of the present invention. In this way, wizard services module 274 can allow or guide a subscriber through their interactions within the virtual work environment.

Figure 6:
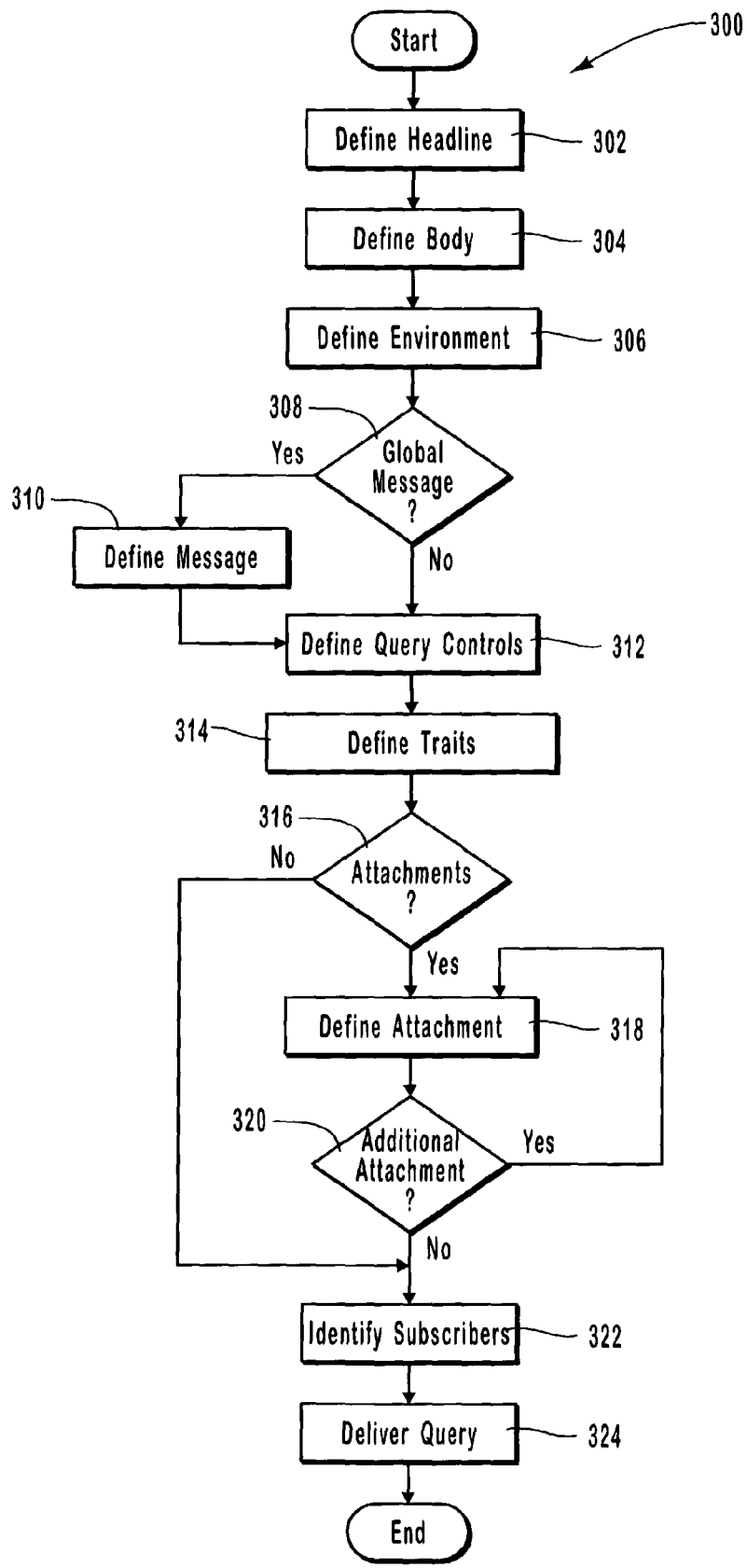
FIG. 6 illustrates a flow diagram representative of one method of the exemplary embodiment of the present invention depicted in FIG. 2.

The query services module 276 facilitates creation of query documents and the queries contained therein. Illustratively, query services module 276 can allow a subscriber to enter a new query document containing a new query or view or modify an existing query document. With reference to FIG. 6, schematically depicted is a flow diagram representing one process for generating a query or creating a query document in accordance with one aspect of the present invention. The process illustrated in FIG. 6 can be initiated through query services module 276.

As illustrated, a process 300 includes defining a headline for the query included in the query document, as represented by block 302. As mentioned previously, the headline has a limited number of characters or words to encourage the author of the query document to create a headline that clearly identifies the focus of the query associated or included within the query document.

Upon defining the headline, the body of the query document is created, as represented by block 304. As with the headline, the body of the query document has a limited number of characters and/or words to facilitate focusing of the query included in the query document. By encouraging the author of the query document to concisely recite the focus of the body of the query, the focus or direction is provided to the query document and all subsequent documents related thereto.

Following defining the headline and body of the query document, an environment for the query document is defined, as represented by block 306. The environment of the query document can be the global environment of the virtual work environment, a personal environment, or the orphanage of the virtual work environment. By identifying the environment as either global, personal, or orphan, certain access rights are granted to the query document. For instance, numerous subscribers can access a global document, while a personal query is accessible only to a single subscriber. Further, an orphan query is displayable in the orphanage where all non-adopted query documents are stored or await adoption by a query manager.

Subsequent to defining the environment of the query document, an author of the query document can optionally recite a message, as represented by decision block 308. The recipients or subscribers to which the query document will be delivered can view the message and receive additional information regarding the direction of the query contained in the query document. In the event that decision block 308 is in the affirmative, an author of the query document defines a message, as represented by block 310. Otherwise, the author can define various query controls, as represented by block 312.

The query controls assignable to the query document can include, but are not limited to, defining whether the query and associated query document will be private or public. When the query and associated query document is a private query, only those subscribers identified as recipients of the query document can access the query document and participate in linking response documents to the query document. When the query document is a public query, one or more of the subscribers of the virtual work environment can view and participate in linking documents to the query document. Optionally, the author of the query document can limit the total number of subscribers that can participate in the query. For instance, the query author or query manager can define a number of non-invited subscribers that can participate in the query. This allows a limited number of subscribers that are not actually invited to participate in the query to link documents to the query document.

In addition to identifying the query document as public or private, the author can define the number of days between receipt of the query document or an invitation to participate in the query included in the query document and responding to the author that they will participate in further developing the query defined within the query document. Furthermore, the author can define the number of days before the query defined within the query document terminates, thereby providing each subscriber with information regarding the importance of a response to the query document. In addition to the above, the author can define the number of days preceding the termination of the query or closing of the query defined within the query document for the creation of a conclusion document for the particular query. Additionally, the author can identify the number of days following authorship of the conclusion document for creation of a results document. Furthermore, the author through query controls can define whether the query document is to be posted on the subscriber's message page.

Following defining the query controls as described with respect to block 312, the author can define document traits, as represented by block 314. These traits can define characteristics or properties associated with the query document. For instance, the traits can identify the query document or a response document as relating to innovation, customer focus, product focus, technology focus, distribution focus, cost reduction focus, reducing costs, increasing efficiency and speed, production capability, quality, service, or other documents as defined by the subscriber. Once these traits have been identified, a subscriber can attach one or more attachments, as represented by decision block 316.

In the event that an attachment is to be associated with the query document, the subscriber can defined the attachment, as represented by block 318, by identity, in one configuration, a file name and path for the attachment and, optionally, a unique title for the attachment. In other configurations, no unique title is included. Once the attachment has been identified and defined, it is attached or associated with the current created query document and the subscriber can attach additional attachments as needed, as represented by decision 320. In the event that additional attachments are to be included, the process of defining the attachment and subsequently verifying of the additional attachments are to be added or repeated as needed.

Following association of the desired attachments, the subscriber can add one or more subscribers to receive the query document, as represented by block 322. For instance, the subscriber can identify one or more subscribers from groups of subscribers or in yellow page listings of individual subscribers and can create an invitation list for the query document. Optionally, the subscriber can identify a deputy query manager or query manager to control or manipulate the query document.

As implied above, the subscriber can access a yellow page listing of subscribers that can access the virtual work environment. The yellow page listing includes one or more of the characteristics, properties, or attributes of the subscriber. For instance, the data described with respect to FIG. 3 for a specific subscriber can be depicted or represented on the yellow page listing. In this manner, a subscriber generating a query document can identify those subscribers that have the capabilities, credentials, training, or interests that would benefit the progress or development of the query defined within the query document.

Following identifying the subscribers, process 300 continues by delivering the query document and/or an invitation to participate in the query associated with the query document to the one or more subscribers, as represented by block 324. In the manner, a subscriber can identify a query document and initiate delivery of the same to subscribers that are selected to participate in answering or responding to the query included in the query document.

Although reference is made to one particular configuration of process 300, one skilled in the art can identify various other configurations of process 300 that are capable of performing the desired function. For instance, the steps of process 300 can be performed in a variety of orders, with one or more of the steps being combined together or eliminated from process 300 depending upon the particular configuration of the present invention.

Returning to FIG. 5, manager module 224 includes a backtrack module 278. The backtrack module 278 is adapted to deliver to a subscriber through subscriber module 206 (FIG. 2) a list of documents that have been recently viewed by the subscriber. The backtrack module 278 allows a subscriber to select any of the identified documents and view the same within a displayed window. Optionally, a subscriber can use backtrack module 278 to initiate display of a pedigree or a number of related documents associated with the selected document in a more detailed view associated with the user interface of the present invention.

Related to backtrack module 278 is pushpin module 280. Pushpin module 280 is adapted to initiate and generate a pedigree of related documents. The pushpin module 280 provides the functionality of allowing the subscriber to add a viewed document to a favorites list and/or adds any document to a favorites list associated with the subscriber. The favorite list of the subscriber identifying one or more documents identified as a favorite document to the subscriber.

Although illustrative services and modules are described in regards to manager module 224, one skilled art can identify various other modules and services can be included within manager module 224. For instance, manager module 224 can include a printer module as adapted to facilitate printing of documents displayed to the subscriber.

Returning to FIG. 3, subscriber module 206 includes an orphanage module 226. The orphanage module 226 enables a subscriber to input or locate a query document within an area or portion of data store 202, termed the orphanage, where query documents without a query manager are stored and available for adoption, i.e., sponsorship by a query manager. As discussed herein, each subscriber has the opportunity to create a variety of documents. In one configuration, a query manager is allowed to initiate a query and track the actions of one or more subscribers in developing an idea and performing intellectual work. The query manager has sufficient real or physical world authority to be deemed or granted the rights of a query manager within the virtual work environment associated with the system. Therefore, subscribers that do not have sufficient real or physical world authority to initiate a query can create a query document containing the query posed by the subscriber and post the same in the orphanage through orphanage module 226. When a query manager identifies a query document, with associated query, that he or she wishes to adopt, the query manager can select the query document and initiate the query by delivering the same to one or more subscribers. In this way, each subscriber can have his or her query document adopted and sponsored.

In addition to the above, subscriber module 206 further includes an administrator module 228. The administrator module 228 is configured to provide the functionality typically associated with an administrator of a system. For instance, through administrator module 228 a subscriber having administrator rights can perform subscriber management functions, query management functions, and system management functions. For instance, illustrative subscriber management functions can include, but are not limited to, viewing and modifying subscriber data, enrolling numerous subscribers at one time, and enrolling individual subscribers. Illustrative query management functions include, but are not limited to, finding existing query documents, deleting and/or creating traits associated with query documents and/or response documents, and defining settings for display and access to queries. Exemplary system management functions include, but are not limited to, delivering system messages to one or more subscribers, controlling system wide security controls, defining master profiles for one or more subscribers, defining system back-up schedules, defining maintenance procedures and schedules, defining departments of organizations, defining sponsors, defining yellow page listings, groups, and parameters, maintaining system logs related to viewing, printing, sorting, and deleting documents, specifying and controlling non-disclosure and non-competition procedures, and managing enterprise points, i.e., managing the number of merit points that a subscriber can receive per action performed within the virtual work environment.

Although administrator module 228 is illustrated as being incorporated within subscriber module 206, one skilled in the art can appreciate that administrator module 228 can be separate from subscriber module 206. Therefore, administrator module 228 can communicate with data store 202 through network 204 without utilizing subscriber module 206.

As discussed above, subscriber module 206 enables a subscriber to create query documents and prepare the same for delivery to one or more subscribers. As a continuation to process described in FIG. 6, the process of FIG. 7 illustrates an exemplary process for delivering to each selected subscriber an invitation to participate with developing the ideas and performing intellectual work associated with the query document, the process being identified by numeral 350.

Figure 7:
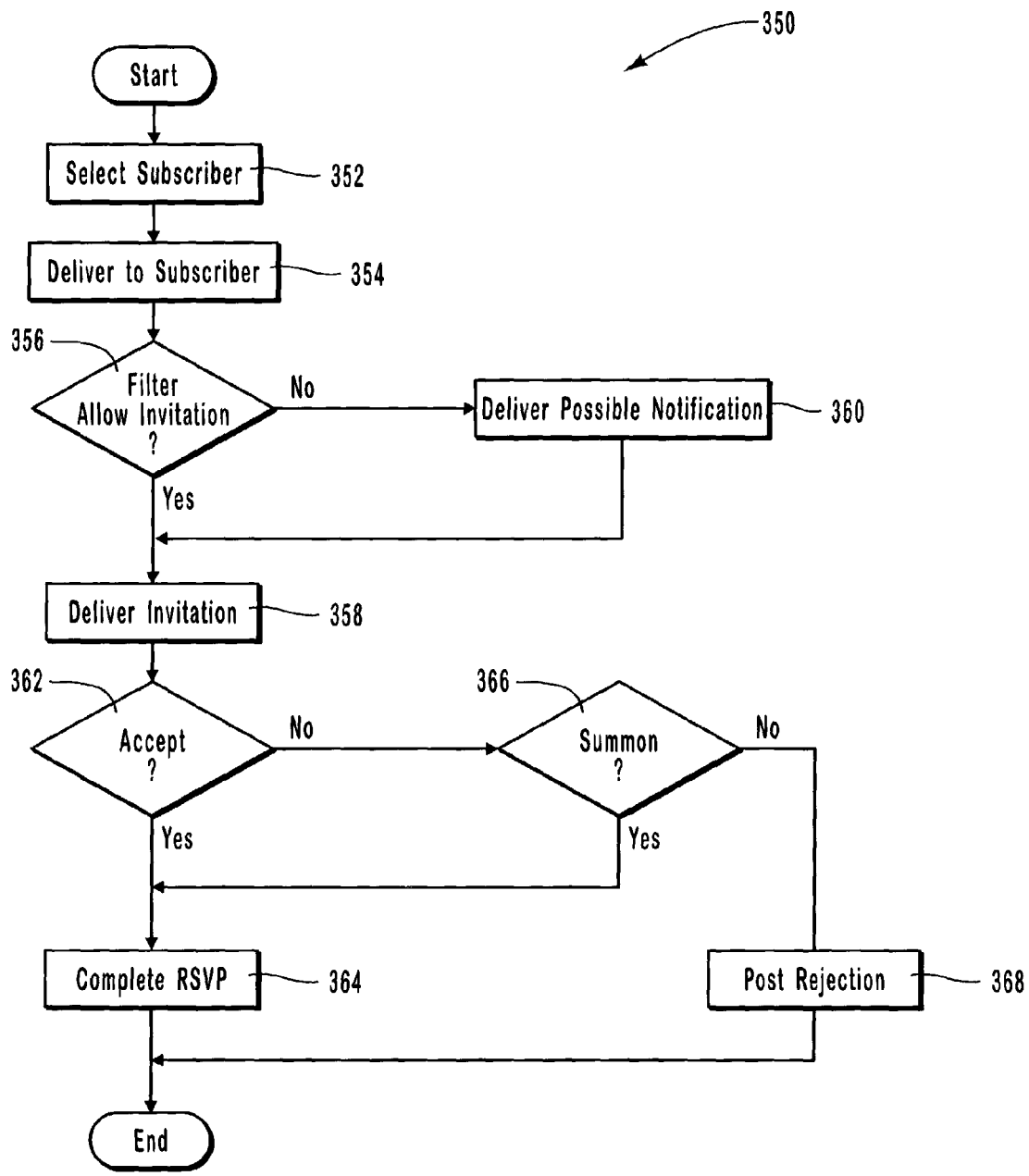
FIG. 7 illustrates a flow diagram representative of another method of the exemplary embodiment of the present invention depicted in FIG. 2.

As illustrated in FIG. 7, a subscriber selects one or more subscribers to which the query document is to be sent, as represented by block 352. Following identification of the subscribers, the present invention facilitates delivery of the query document and/or an invitation to participate in the query associated with the query document to the subscriber, as represented by block 354.

Upon receiving an invitation to participate in a query associated with a query document, the system of the present invention verifies that the filters associated with the selected subscriber allow the invitation, as represented by decision block 356. If the filters allow delivery of the invitation to participate in a query associated with a query document, the system delivers the invitation to the subscriber's account, as represented by block 358. Otherwise, a passive notification is delivered to the recipient that indicates the availability of an invitation to become involved with the identified query, as represented by block 360.

Once the selected subscriber has received the invitation, the subscriber can accept or decline the invitation, as represented by decision block 362. When the subscriber or selected subscriber accepts the invitation, a RSVP notice is completed by the selected subscriber and returned to the query manager, as represented by block 364. In the alternative, when a selected subscriber rejects the invitation, the system next determines whether or not the selected subscriber has been summoned to participate in the query, as represented by decision block 366. In the event that a more senior subscriber summoned the selected subscriber, the selected subscriber is directed to complete the RSVP, as represented by block 364. Alternatively, in the event that the selected subscriber was not summoned and still rejects or declines to accept the invitation, the invitation rejection is posted the manager of the query, as represented by block 368. The manager can use this rejection during subsequent interviews with the subscriber, i.e., performance interview, etc.

Although reference is made to one particular configuration of process 350, one skilled in the art can identify various other configurations of process 350 that are capable of performing the desired function. For instance, the steps of process 350 can be performed in a variety of orders, with one or more of the steps being combined together or eliminated from process 350 depending upon the particular configuration of the present invention.

Subsequent to creating a query and delivering a query to one or more selected subscribers, the selected subscribers can add additional documents, such as response documents, to the identified query document. For instance, as discussed above, typically, a query document indicates a query that initiates or requests responses to further develop the information contained within the query. Consequently, the present invention facilitates adding response documents to a query or otherwise relating one or more response documents to a query document.

As part of delivering query documents and/or response documents to one or more subscribers, a subscriber can initiate a call-to-arms process. A subscriber attempting to facilitate delivery of a query document and/or response document to a subscriber that would typically not receive the query document and/or response document may use the call-to-arms process. For instance, in one configuration, a subscriber may have filters that prohibit delivery of certain documents from certain subscribers. Using the call-to-arms process, a subscriber can circumvent those filters and deliver the documents to the filtered subscriber. In another configuration, the subscriber can receive substantially all documents that are sent to the subscriber and filter the documents through modifying the order by which the documents are presented to the subscriber through a user interface of the present invention, such as interfaces depicted in FIGS. 9, 15, and 15, based upon criteria set by the subscriber. For instance, the subscribers can re-order the received documents, such as, but not limited to, one or more invitations to participate or engage with one or more query documents, based upon the number of merit points associated with the document, the number of other subscribers engaging with the document, the document traits associated with the document, the name or other characteristics or properties of the subscriber sending the document, or any other characteristic or property of the document.

In one configuration, the call-to-arms process allows the subscriber to delivery a query document and/or response document to another subscriber following delivery of a number of merit points to the receiving subscriber. Alternatively, the subscriber attempting to deliver the query document and/or associated response documents can identify a minimum number of subscribers that have to become affiliated with or join the call-to-arms process before the receiving subscriber will receive the query document and/or associated response document. This information can be stored in data store 202 (FIG. 2), such as, but not limited to, within a yellow page listing of the filtered subscriber. Similarly, the subscriber attempting to deliver the query document and/or associated response documents can identify a minimum scoring for the query document and/or associated response document needed before the receiving subscriber will receive the same. As with the value for the minimum number of subscribers, the minimum scoring value can be obtained from the yellow page listing.

The subscriber attempting to deliver the query document and/or associated response document can also promote the document to other subscribers through adding comments to the query document and/or response document, scoring the documents highly, forwarding copies of the documents to various other subscribers in the hope that the minimum values are obtained. In the event that this occurs, the subscriber can invite the receiving subscriber to view the query document and/or associated response documents.

One skilled in the art can identify a variety of other manners for facilitating delivery of a query document, associated response documents, or invitations to participate in a query to a subscriber whose filters would typically prevent delivery of the same. For instance, a subscriber can associate one or more merit points with a query document thereby indicating the importance of the query document to a subscriber. Alternatively, the subscriber can invite a large number of subscribers to participate or engage with the query document, thereby encouraging a subscriber to also participate or engage with the query document.

Figure 8:
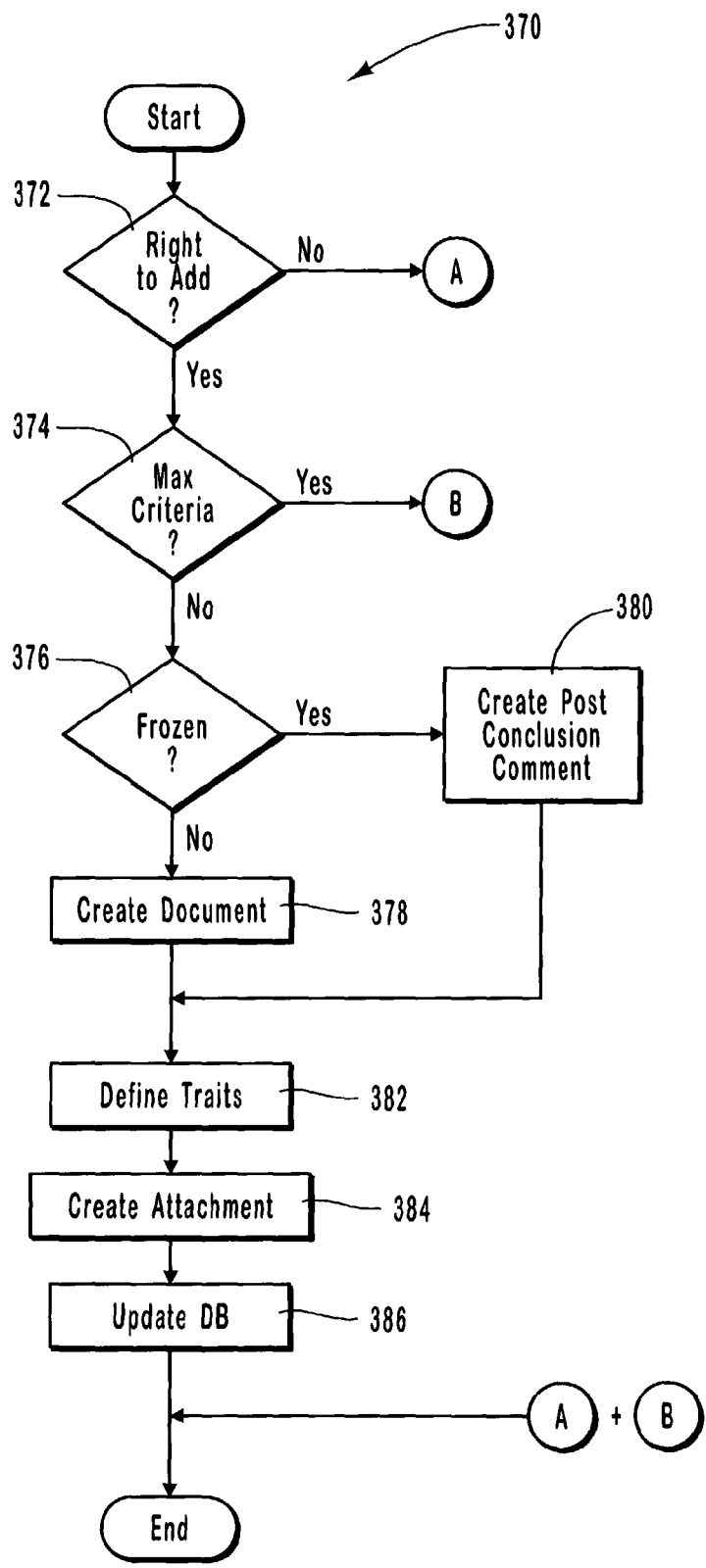
FIG. 8 illustrates a flow diagram representative of yet another method of the exemplary embodiment of the present invention depicted in FIG. 2.

With reference now to FIG. 8, depicted is one configuration of a flow diagram representative of the process for attaching or associating one or more response documents to a query document, the process being identify by numeral 370. As illustrated, a decision is made as to whether a subscriber has rights to add a response document to a query document, as represented by decision block 372. In some circumstances, a subscriber is unable or does not have the right to add to an existing query. For instance, the subscriber may have lost a sufficient number of merit points that the subscriber's merit point total is below a threshold value that allows the subscriber to participate in the virtual work environment or engage with one or more documents. In such a case, the subscriber will be unable to attach or link another document to the identified query document.

In the event that the subscriber has the rights to add additional documents to an identified query document, such as when decision block 372 is in the affirmative, the system verifies that the selected query document does not have a maximum number of additional response documents linked thereto, such as depicted by decision block 374. In the event that the maximum number of subscribers has not been reached, it is next determined whether the query has been terminated, as represented by decision block 376.

Once a query has terminated, no additional response documents may be added to the query document. Consequently, if such is a case, then a post-conclusion comment document can be added to the query document, as represented by block 380. Alternatively, if the query document or query associated with the query document has not terminated, then the subscriber can add a response document, as represented by block 378. The creation of the response document can have a similar format to that previously described with respect to creating a query document, as depicted and discussed with respect to FIG. 6. Therefore, various traits and characteristics of the document are defined, as represented by block 382, and various attachments are associated with the response documents, as represented by block 384. Following creation of the response document, the system updates data store 202 (FIG. 1) as represented by block 386.

Although reference is made to one particular configuration of process 370, one skilled in the art can identify various other configurations of process 370 that are capable of performing the desired function. For instance, the steps of process 370 can be performed in a variety of orders, with one or more of the steps being combined together or eliminated from process 370 depending upon the particular configuration of the present invention.

As discussed above, the system provides various functions to a subscriber to participate within a virtual work environment. To aid a subscriber to initiate one or more of the functions described herein, subscriber module 206 (FIG. 2) provides one or more user interfaces that include one or more selectable icons to initiate different functionality of system 200. Further, the user interfaces can display query documents, response documents, and the links therebetween in a graphical manner to aid with understanding the development of an idea contained within the query document and performance of intellectual work within the virtual work environment.

Figure 9:
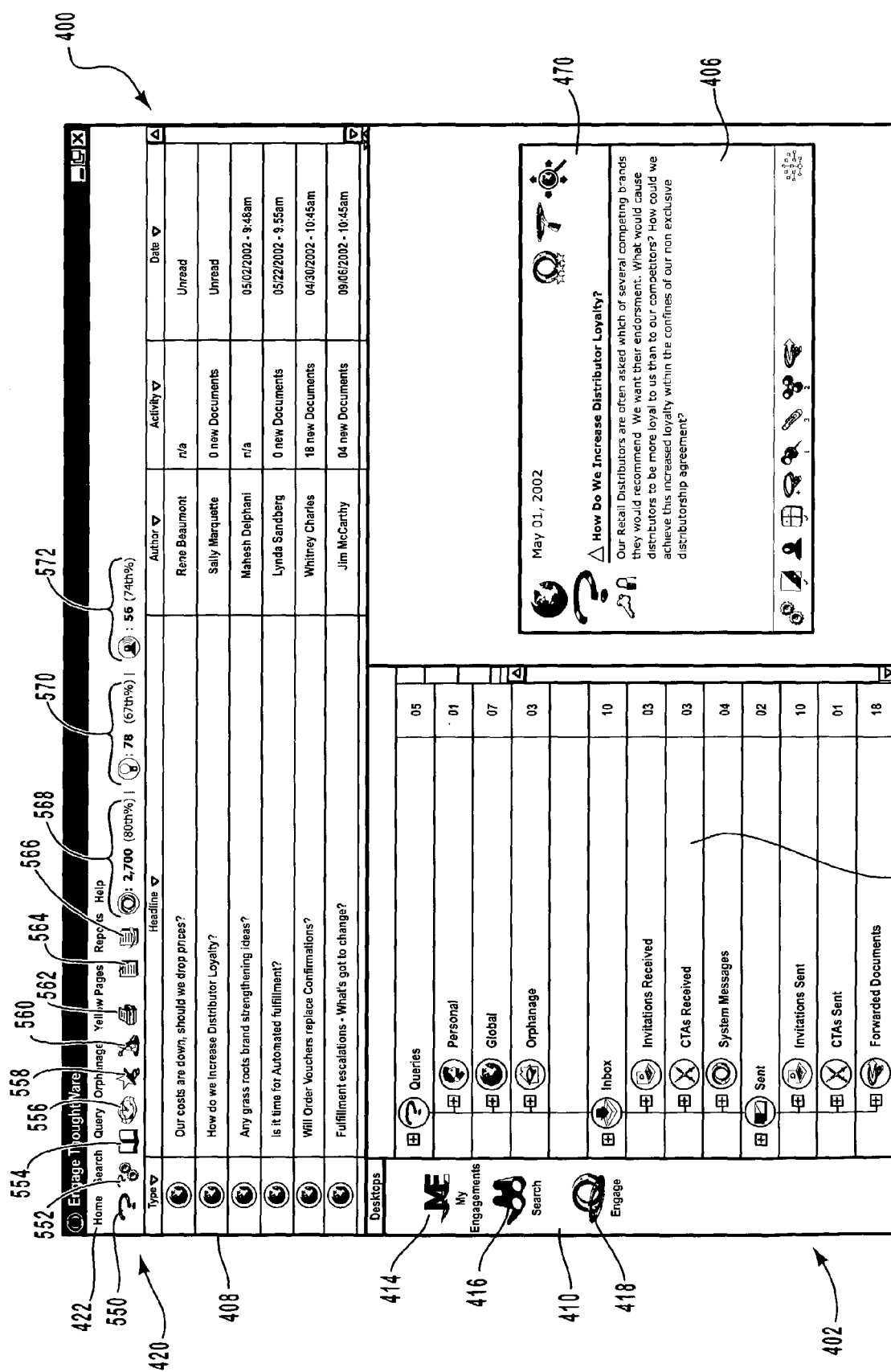
FIG. 9 illustrates one exemplary embodiment of a user interface for enabling a subscriber to use the exemplary embodiment of the present invention depicted in FIG. 2.

Referring now to FIG. 9, a schematic representation of one illustrative embodiment of a suitable user interface is depicted. This user interface can be displayed through subscriber module 206a–206n to a subscriber. The user interface shown facilitates access to data store 202 and enables each subscriber to engage, using subscriber module 206a–206n and/or data store 202, with one or more documents stored at data store 2020 and/or one or more other subscribers.

As depicted, interface 400 includes a navigation area 402 that provides the navigation tools used by a subscriber to participate or engage within the virtual work environment and perform actions utilizing system 200. Interface 400 can include a document area 406 for displaying documents to the subscriber and a results area 408 for displaying lists of documents and/or graphical representations of documents identified using one or more tools of the system of the present invention.

Figure 15:
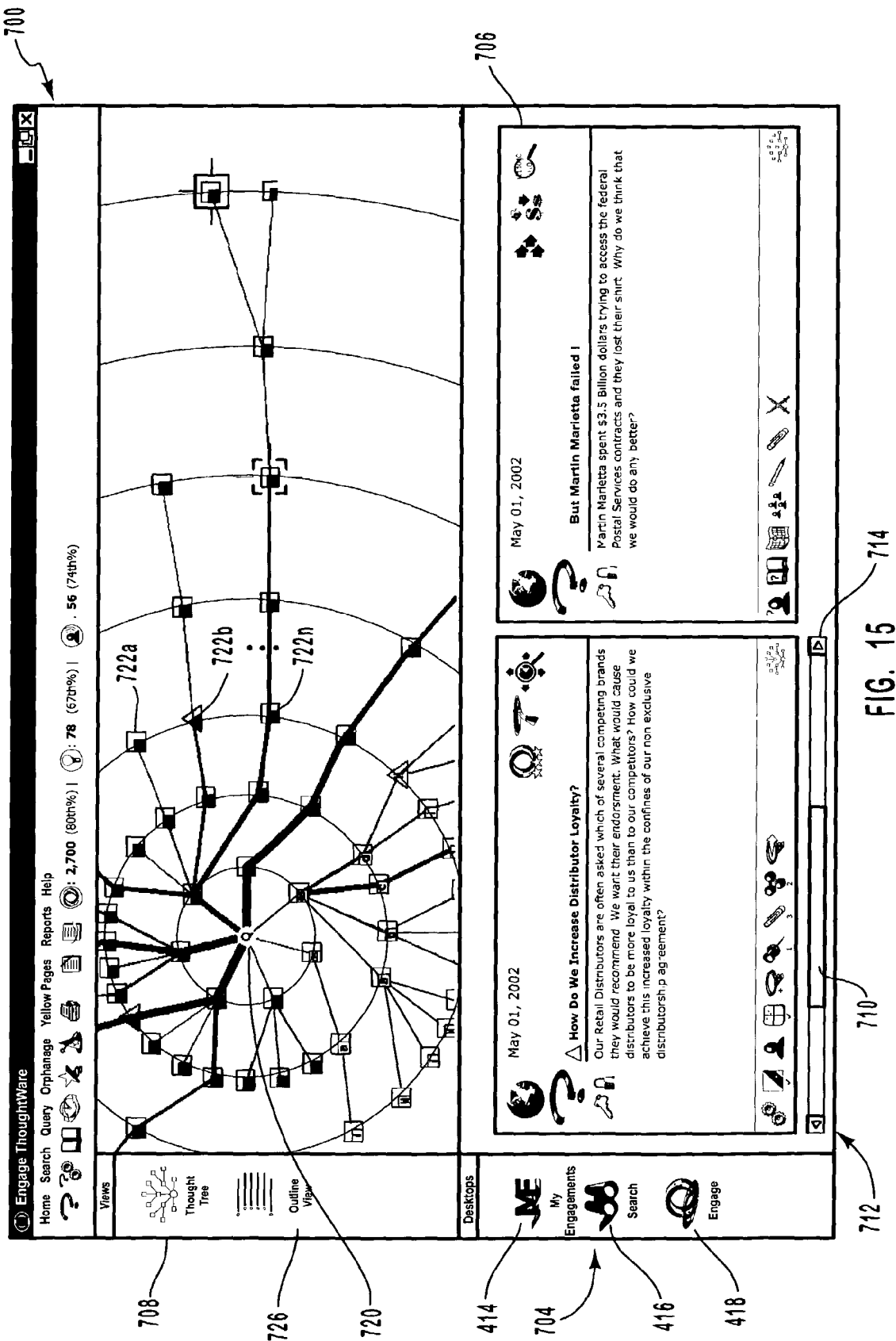
FIG. 15 illustrates still another exemplary embodiment of a user interface for enabling a subscriber to use the exemplary embodiment of the present invention depicted in FIG. 2.

Navigation area 402 includes a navigation bar 410 and a navigation table 412. The navigation bar 410 includes one or more icons that are capable of being selected by a subscriber to initiate different functions of the system of the present invention. By selecting an engagement icon 414, the interface displayed in FIG. 9 may be accessed. In contrast, by selecting search icon 416, an interface 600 depicted in FIG. 14 is displayed to a subscriber. This interface 600 allows a subscriber to search data store 202 (FIG. 2) based upon one or more different search criteria, as will be discussed in more detail hereinafter. In addition to the above, by selecting engage icon 418 a user interface 700 depicted in FIG. 15 is presented to the subscriber. This interface 700 enables a subscriber to review chains or pedigrees of documents that have been linked together by the subscribers. The interface 700 provides a visual representation of the linked documents that can be navigated by a subscriber to identify ideas and intellectual work and allow the subscriber add other documents to the chain or pedigree of documents.

The navigation table 412 provides a portal through which the subscriber can access query documents, stored documents, query invitations, and queries or documents sent to other subscribers. With reference to FIG. 9, navigation table 412 can include a query listing area 430, an inbox listing area 432, and a sent document area 434. As depicted, a query listing area 430 includes one or more icons that can be selected to initiate different functionality of query listing area 430. By selecting a query icon 434, a subscriber can access the queries with which that subscriber is currently engaging; a numeral value of the number of queries is associated with query icon 434. Optionally, the queries can be displayed to the subscriber within a results area 408 of interface 400 (FIG. 9).

Additionally, query listing area 430 includes a personal query icon 440, a global query icon 442, an orphanage query icon 444, and an open forum icon 446. Upon selecting personal query icon 440 those queries personal to the subscriber, i.e., not accessible to other subscribers, are displayed in results area 408 (FIG. 9). The queries and/or other documents accessible through personal query icon 440 are accessible only to the subscriber having access rights to the subscriber's account.

In contrast, by activating global query icon 442 all queries and/or other documents that are accessible to all or substantially all subscribers of system 200 (FIG. 2) are listed in results area 408 (FIG. 9). Similarly, through activating orphanage query icon 444, all queries that are available for adoption by a query manager are listed in results area 408. The orphanage area of data store 202 (FIG. 2) contains queries that have been initiated by a subscriber of system 200, where the subscriber does not have "real world" authority to initiate a query. For instance, the subscriber may not have "real world" authority to act as a query manager, i.e. sufficient authority to initiate a query and propagate it through or to one or more subscribers of system 200. Consequently, a subscriber that wishes to pose a query can do so and deposit the same within the "orphanage" of data store 202 for adoption or selection by a query manager that will initiate the query with one or more subscribers.

In addition to the above, navigation area 412 includes an inbox listing area 432. The inbox listing area 432 lists the documents and/or queries that were received by the subscriber. For instance, and with reference to FIG. 10, inbox listing area 432 can include an invitation received icon 450. Through activating invitation received icon 450 a subscriber can view the query invitations received by the subscriber, these invitations being displayed in results area 408 or a popup window. Further, this inbox listing area 432 can include a call-to-arms invitation icon 452. Through activating invitation received icon 452 a subscriber can view the query documents and associated response documents that have been delivered to the subscriber from a query manager of the query document that has identified the query document and associated response documents as being important for the subscriber receiving the same. Additionally, inbox listing area 432 can include a system message icon 454. Through activating system message icon 454, a subscriber can view the messages that are automatically generated by the system and/or created by administrators of the system.

Figure 10:
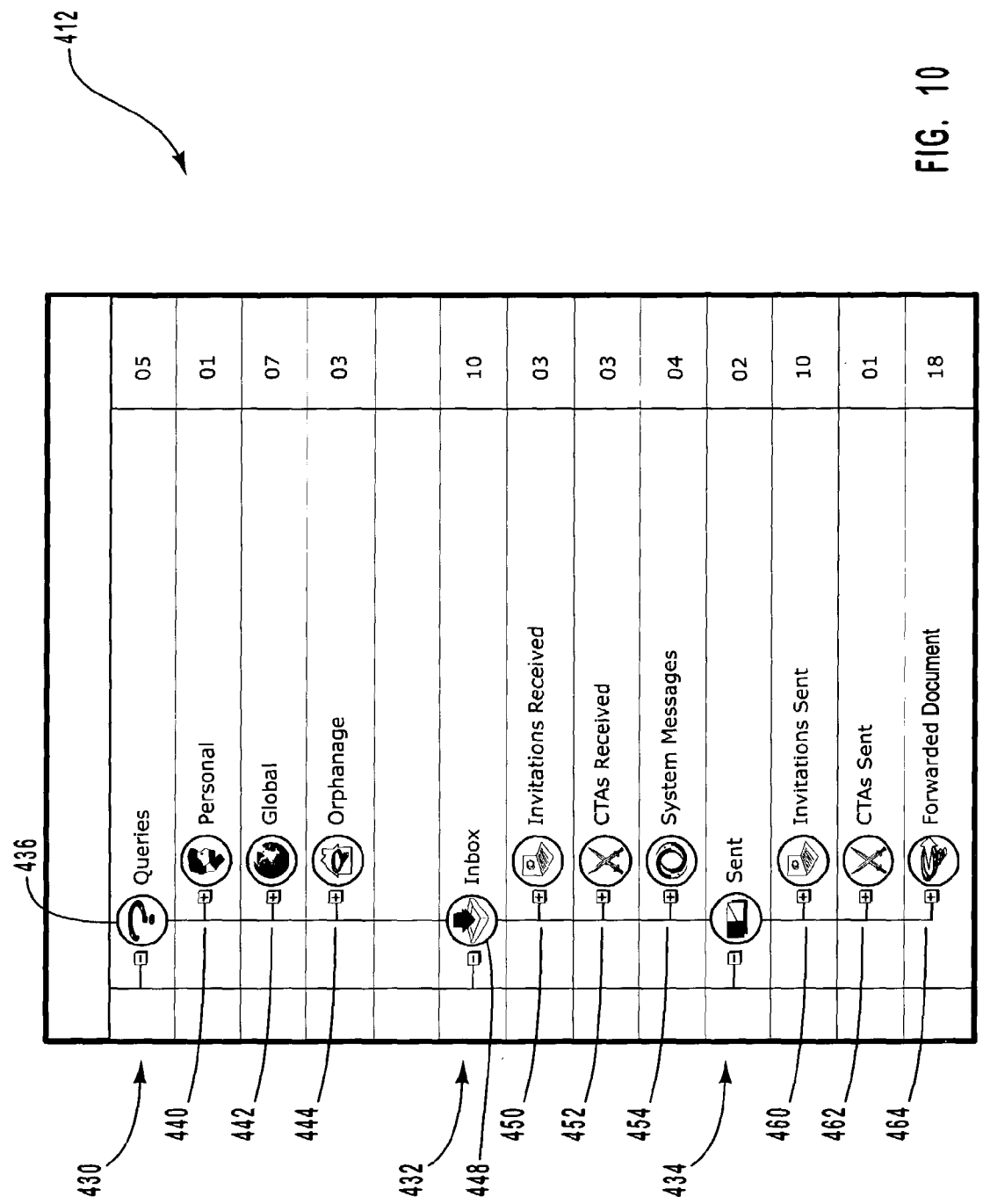
FIG. 10 illustrates a more detailed representation of a portion of the user interface of FIG. 9 in accordance with another aspect of the exemplary embodiment of the present invention depicted in FIG. 2.

As represented in FIG. 10, the subscriber has received three query invitations, as identified by the numeral value associated with invitation received icon 450, three call-to-arms invitations, as identified by the numeral value associated with CTA received icon 452, and four system messages, as identified by the numeral value associated with system messages icon 454, to give a total of ten inbox documents, as represented by the numeral value associated with the inbox listing area icon.

In a similar way to inbox listing area 432, sent document area 434 includes selectable icons that facilitate access to lists of documents sent by the subscriber, such as, but not limited to, invitations sent to subscribers, call-to-arms invitations sent, and documents forwarded to other subscribers.

Through activating invitation sent 460*a* subscriber can view the query invitations sent by the subscriber, these invitations being displayed in results area 408 or a popup window. Similarly, through activating call-to-arms sent icon 462 a subscriber can view the query documents and associated response documents that have been sent to other subscriber from the subscriber acting as a query manager of the query document. Further, through activating forwarded document icon 464 a subscriber can view the documents sent by the subscriber to other subscribers.

With reference again to FIG. 9, interface 400 includes document area 408. Document area 408 is configured to display selected documents to a subscriber. Each document can have various characteristics and attributes related thereto, as discussed with respect to FIG. 2 and data store 202. Each document includes iconic representations of various characteristics, attributes, and traits of the document.

Figure 11:
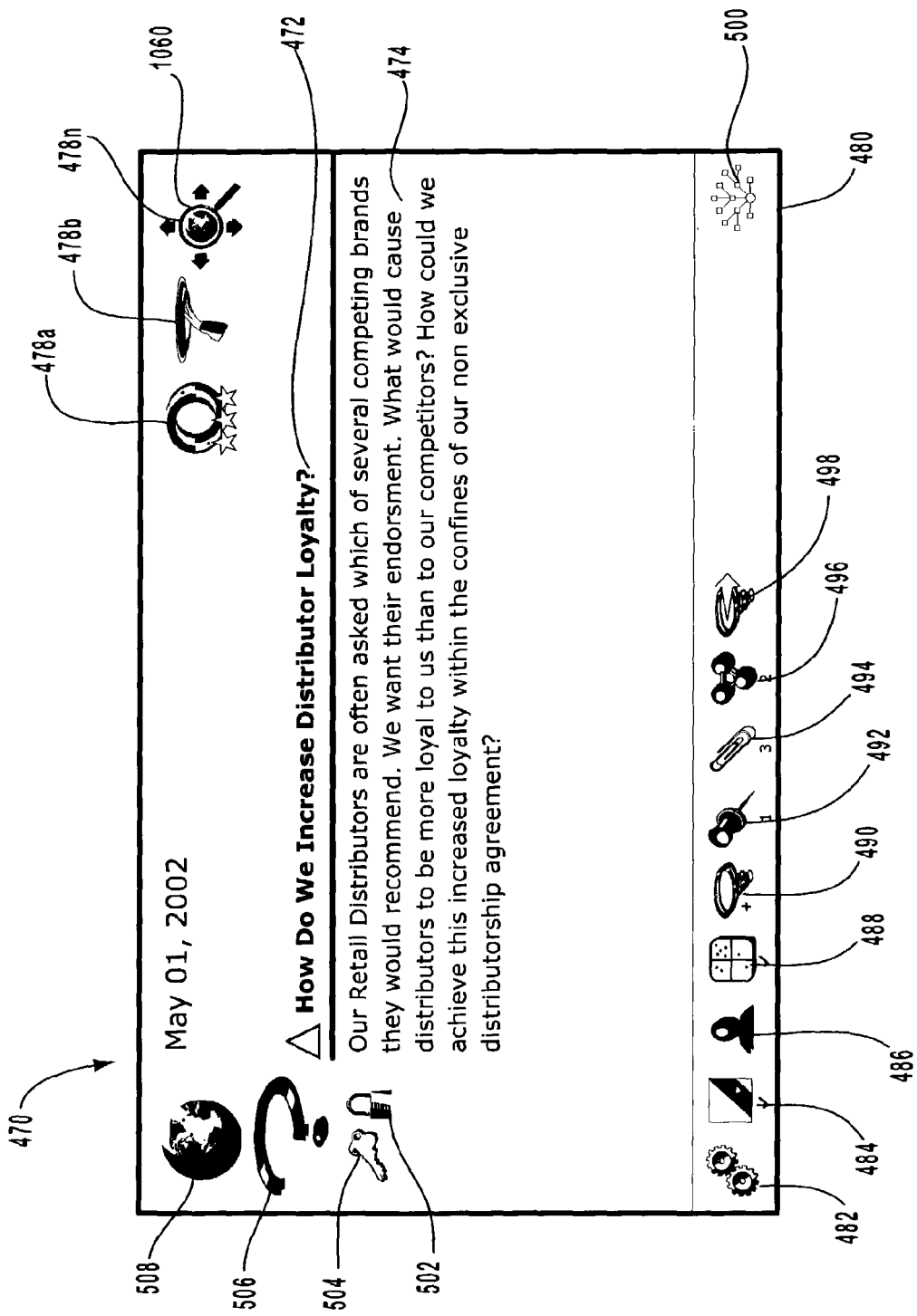
FIG. 11 illustrates a more detailed representation of another portion of the user interface of FIG. 9 in accordance with another aspect of the exemplary embodiment of the present invention depicted in FIG. 2.
Figure 12:
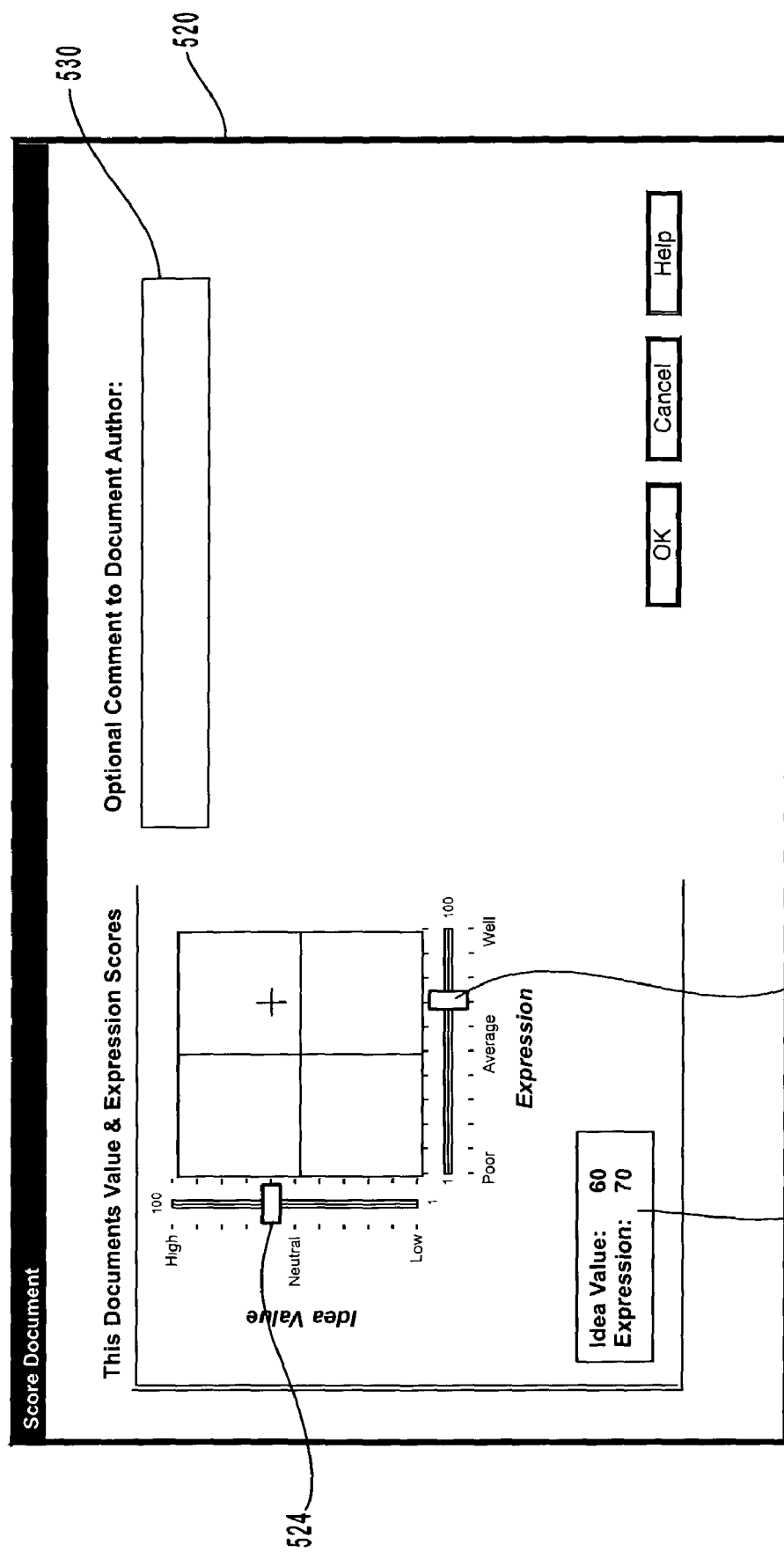
FIG. 12 illustrates another exemplary embodiment of a user interface for enabling a subscriber to use the exemplary embodiment of the present invention depicted in FIG. 2.

As illustrated in FIG. 11, a document 470 includes a headline 472. Headline 472 has a limited number of characters to encourage the subscriber to compress the information related to the query document or response document. By so doing, the subscriber is encouraged to engage with the document by identifying a succinct or concise title for the document.

In addition to headline 472, each document 470 includes a body 474. In a similar manner to headline 472, body 474 has a limited number of characters to again encourage the subscriber to compress the data related to the document to a small size. Depending on the particular configuration, the size of headline 472 and body 474 can have a variety of sizes. As discussed above, in one embodiment, headline 472 can have a limiting size of 50 characters, although it can be appreciated that any number of characters less than or greater than 50 can also be used. Similarly, body 474 can have a limited number of characters, such as but not limited to 500 characters. Alternatively, body 474 can have a greater or lesser number of characters depending upon the configuration of the present invention. In alternative configurations, headline 472 and body 474 can be limited in the number of words rather than the number of characters.

In addition to headline 472 and body 474, document 470 includes one or more document traits 478*a*–478*n*. Each trait 478*a*–478*n* depicts graphically certain traits regarding document 470. For instance, each document can include one or more graphical representations of the document traits, where the traits can relate to innovation, customer focus, product focus, technology focus, distribution focus, cost reduction focus, low cost, speed, production capability, quality, services, or another subscriber defined trait. One skilled in the art, in light of the teaching contained herein, can identify other types of traits that may be used to define characteristics or properties of document 470. For instance, a government agency may identify traits related to national security, military, The White House, Patent and Trademark Office, homeland security, terrorism, or various other types of traits. Generally, any trait and any graphical representation of the trait can be associated with a document.

In addition to the above, each document 470 can include a document toolbar 480. Document toolbar 480 includes various icons that may be selected to initiate different functions or tools that may be used in association with document 470 and system 200 (FIG. 2). As depicted, toolbar 480 includes a general services icon 482. General services icon 482 initiates various services that may be accessible and associated with document 470. These services include, but are not limited to, copying moving documents between the global area and the personal account of the subscriber, enabling and disabling posting of documents, sending documents to the orphanage, sending query documents to other subscribers, moving documents, deleting documents, archiving documents, or other functions as may be identified for manipulating documents within the system.

Toolbar 480 also includes a note icon 484. Note icon 484 initiates the creation of a note that may be associated with document 470. This note can include information that may be attached or associated with document 470. The inclusion of a checkmark or other indicator below note 484 indicates that a note has been attached or associated with document 470. Similar annotations or indicators can be associated with other icons included or associated with document 470 and/or the interfaces described herein. For instance, the note icons can include indicators having a numerical value to indicate the number or quantity of notes associated with the document. Similar indicators can be associated with other icons associated with document 470 and/or the interfaces described herein.

Through toolbar 480, it is also possible to send a document or otherwise contact the author of document 470. This can be achieved through activating author contact icon 486. By activating icon 486, a subscriber can prepare a message that is deliverable to the author of document 470.

Another icon included in toolbar 480 is scoring icon 488. By activating scoring icon 488, another display is presented to the subscriber, such as that illustrated in FIG. 12. As depicted, the system of the present invention generates a scoring interface 520 that can be used to score document 470. In this illustrated configuration, quantitative evaluations can be made of the value and expression of idea or other intellectual work included in document 470 through display 522 and associated manipulatable controls 524 and 526. The values of such scoring are depicted in region 528. Additionally, qualitative evaluations of document 470 can be made by including a comment to the author of document 470 within a comment region 530.

Figure 13:
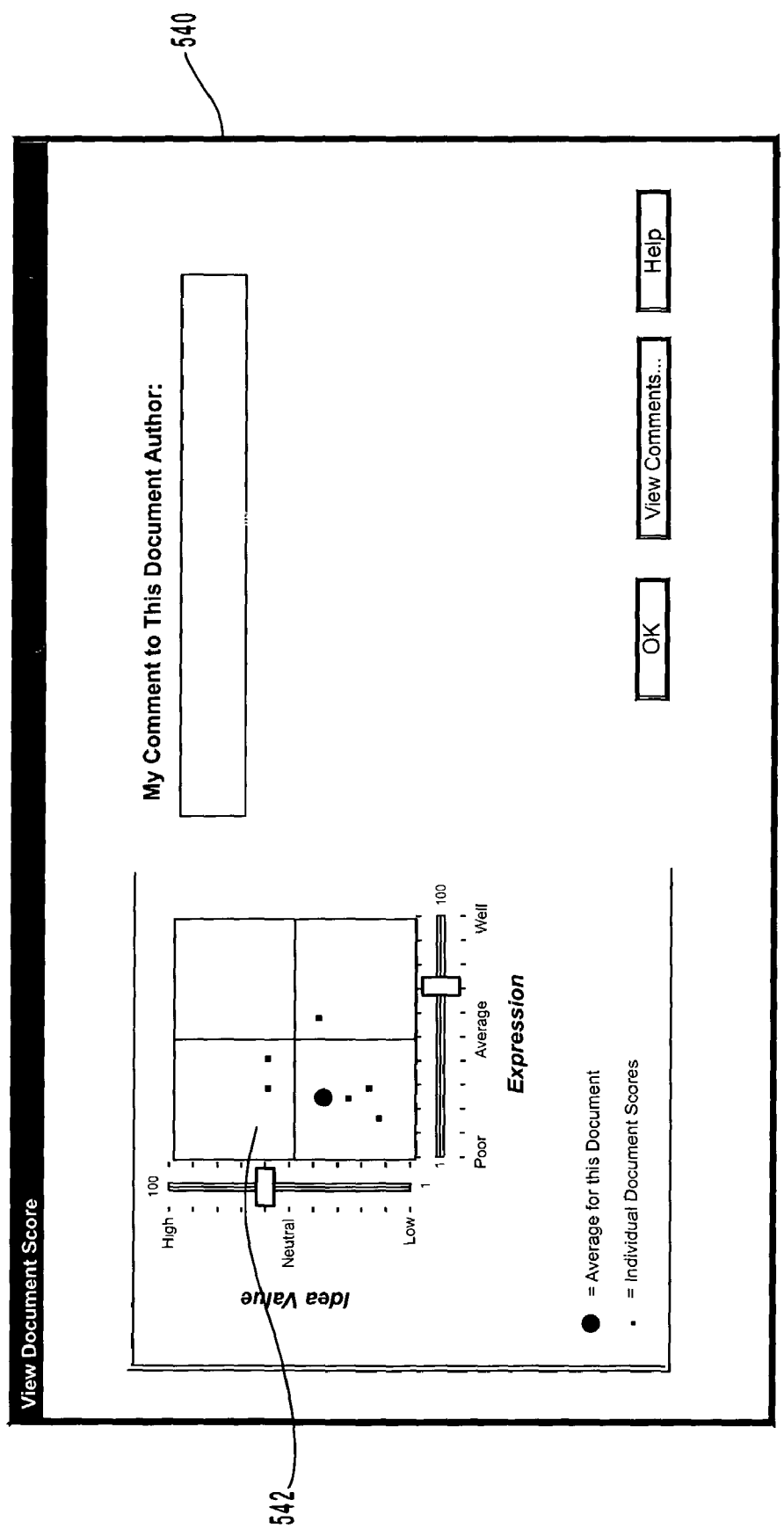
FIG. 13 illustrates yet another exemplary embodiment of a user interface for enabling a subscriber to use the exemplary embodiment of the present invention depicted in FIG. 2.

Following scoring of document 470, subsequent activation of scoring icon 488 (FIG. 11) activates interface 540, as depicted in FIG. 13. In this configuration, a scatter diagram 542 is illustrated with all values of scores provided for the specific document displayed using interface 400 (FIG. 9). Additionally, an optional indication of an average rating for document 470 is indicated on interface 540. By limiting the views provided to the subscriber before scoring of document 470, the subscriber is not influenced by the ratings given to document 470 by any other subscriber. This scoring, or the average of the scoring, by all subscribers of a particular document can be tabulated and provided as a document score or rating associated with the document in interface 400 (FIG. 9).

Returning to FIG. 11, toolbar 480 includes a document icon 490. By initiating document icon 490, one or more interfaces are depicted to aid the subscriber in creating a document that may be or is linked to this particular document. Illustratively, the one or more interfaces facilitate creating a document in a manner as described in the flow diagram depicted in FIG. 6. By so doing, a chain or pedigree of related documents can be created that may be displayed, as will be discussed in more detail hereinafter.

In addition to adding document icon 490, toolbar 480 can include a add document to favorites icon 492. By selecting icon 492, the viewed document is added to the subscriber's personal inbox, whether it by the query inbox or a document inbox, and can be accessible by subscriber. In this manner, a subscriber can copy globally accessible documents to account 212a–212n (FIG. 3) that is accessible only to the subscriber.

The toolbar 480 can also include an attachment icon 494. By initiating or activating icon 494, a subscriber can attach one or more additional documents to the displayed document. For instance, the subscriber can attach one or more text document, graphics documents, audio documents, video documents, or various other documents that may be attached to the document. Furthermore, using connection icon 496, a subscriber can connect a particular document to another document that may be within or relate to another query document. In this way, a subscriber can identify connections between various documents and link the same to further promote the development of ideas and intellectual work.

To allow a subscriber to forward documents to other subscribers in an efficient manner, toolbar 480 includes a forward document reference icon 498. To enable the subscriber to quickly initiate engagement within the identified document, toolbar 480 includes an engage icon 500 that initiates similar functionality to engage icon 418 of navigation bar 410 (FIG. 9).

In addition to the above, each document 470 includes various icons to depict characteristics and attributes of document 470. For instance, icon 502 can be associated with the document to depict whether or not the document is locked to a specific group of subscribers or open to one or more additional subscribers to those invited to respond to the query included in the document. Additionally, icon 504 can be included to identify the documents as being public or private. Furthermore, icon 506 can be included to identify the type of the document, i.e., query document or one of a variety of response documents, while icon 508 can be included to indicate whether the document is a global document, a personal document, or an orphanage document.

Returning to FIG. 9, interface 400 includes a results area 408. The results area 408 can include or depicts the information generating from selecting one or more of the icons indicated in navigation area 410 and/or initiating to engage with one or more documents. As such, results area 408 will change in configuration based upon the information provided therein. For instance, the number of columns, the names and number of headings, and other elements of results area 408 will change based upon the actions initiated by the subscribe, as illustrated in FIGS. 14 and 15.

In addition to the above, interface 400 includes a global toolbar 420. Global toolbar 420 includes various icons that may be activated or selected to activate different functionality of the system. For instance, in the depicted configuration, global toolbar 420 includes a create query icon 550. By initiating or selecting create query 550, a subscriber is allowed to create a query document. For instance, the process of creating a query document is described in FIG. 6.

Similarly, by activating a query services manager icon 552, a subscriber is allowed to activate a services manager to initiate a query, track the status of a query, and propagate the query to the desired individuals or subscribers.

In addition to the above, global toolbar 420 includes a yellow pages icon 554. By activating yellow pages 554, a subscriber is presented, such as in results area 408, listings of the various subscribers that are within the virtual work environment. The listings can be searched through appropriate search services or may be reviewed in alphabetical order, group order, department order, educational background order, or in another other searchable manner known to those skilled in the art in light of the teaching contained herein. Each subscriber listing includes information regarding the subscriber, such as but not limited to, name, email address, affiliated department, employment title, telephone number, educational background, certificates or awards, responsibilities, work experience, career interests, and other information specific to the subscriber as can be understood by the description contained herein.

To allow a subscriber to identify a history of a particular document, a subscriber can select history manager icon 556. The history manager icon 556 enables a subscriber to access a listing of the actions performed to or relating to the document.

In addition to the above, global toolbar 420 includes a favorites manager icon 558. By activating favorites manager 558, a list of the documents identified by the subscriber as favorite documents is presented to the subscriber in results area 408, optionally in document area 406 and/or in a popup window.

In addition to the above, global toolbar 420 includes a wizard icon 560 and a print services icon 562. Wizard icon 560 can be selected to initiate wizards to perform various functions, while selecting print services icon 562 initiates printing of one or more documents or other reports. One or more of the wizards initiated through wizard icon 560 aid the subscriber with creating documents, searching documents, creating favorites lists, and performing various other tasks. As can be appreciated by one skilled in the art, any number of wizards that can be associated with wizard icon 560 so long as each wizard aid the subscriber to perform one or more actions to engage with one or more documents and one or more subscribers.

Global toolbar 420 also displays information about a particular subscriber accessing system 200 (FIG. 2). As discussed previously, a subscriber can generate merit points through participating in or engaging with one or more other subscribers and/or one or more other documents. These merit points are redeemable to allow the subscriber to perform certain actions. In one embodiment, a subscriber must keep the number of merit points above a threshold level in order to perform actions or engage with or participate in developing ideas and performing intellectual work. As shown, total points icon 568 depicts a total number of points associated with the subscriber. Additionally, the icon, optionally, displays a percentile placement or ranking of the subscriber based upon other subscribers for a particular organization. Further, icons 570 and 572 depict the scores of the subscriber from an idea value point of view and expression point of view, respectively. Stated another way, icons 570 and 572 depict the rating of the value of the query documents and the response documents created by the subscriber based upon the perceived value and expression of the data or information included in the query document or response document; this rating being based upon the cumulative scorings for all documents authored by the subscriber. Again, optionally, the percentile ranking of the subscriber relative to other subscribers can be depicted. To obtain additional information regarding these ratings or refresh the number of points based upon actions taken by the subscriber, a subscriber can select points detail icon 564 and refresh points icon 566, respectively.

In addition to the above, interface 400 includes a menu bar 422. This menu bar 422 can provide an alternate manner to initiate some or all of the functionality accessible through selecting or initiating one or more of the icons described herein. Consequently, menu bar 422 can provide various other functionality as discussed in Table 1.

TABLE 1

| MENU ITEM | FUNCTIONALITY |
| --- | --- |
| Home | Logging on and off; defining user preferences; defining query and document controls; checking account status; changing password; viewing documents; viewing orphan documents; software application information; training; and papers. |
| Search | Search services associated with a search within a global area, a personal area, and the orphanage area. |
| Query | Initiating and tracking queries. |
| Tools | System administration tools. |
| Orphanage | Initiating orphanage services. |
| Yellow Pages | Accessing the yellow page directory of subscribers. |
| Report | Generate reports indicating a quantity of engagement, a quality of engagement, and results of engagement and system administrator reports. |
| Help | System helps. |

Referring now to FIG. 14, depicted is interface 600 where a subscriber has selected search icon 460. Elements or structures of interface 600 corresponding to like elements or structures of interface 400 will be designated by like numerals. Similarly, the features and functions of interface 400 apply to the discussion of interface 600.

As depicted, a navigation area 604 displays search criteria area 612. The search criteria area 612 includes various fields that are selectable by the subscriber to generate search request or queries used to search data store 202 (FIG. 2). The results of the search request are displayed in results area 408, while a document that is selected by a subscriber is displayed in document area 408.

The search criteria can be selected from drop down menus, manually input, or some other interface as known to those skilled in the art. Search terms input into search term field 630 can be combined with domains terms 632, i.e., a domain of the document being selected from a personal document, a global document, or an orphanage document. Furthermore, the search terms can include and content attribute terms 1212 that define whether the search should be performed in the body of the document, the headline of the document, in either the headline or the body of the document, or in neither the headline or the body of the document. Additionally, document trait terms 636, i.e., identification of one or more traits of the documents to be searched for, and search dates 636, i.e., start dates and stop dates for the creation dates of the documents, can be associated or form part of the search criteria.

In addition to these terms, other terms can be included to form the search criteria. For instance, one or more type terms 638 can be included that define one or more types of document to be searched, such as, but not limited to, query document, response document, etc. Additionally, one or more touched attribute terms 640 can be included that define actions performed upon the document, such as, but not limited to, scoring of the document, contacting the author, attaching a note or document to the document, referencing the document to another document within a different document tree, adding an attachment to the document, or any other action performed to or relating to the document. Furthermore, one or more touch date terms 642 can be included to define date limitations of when a subscriber touched a document, i.e., dates when a subscriber engaged or performed actions to or related to a document.

With reference now to FIG. 15, indicated is user interface 700 where a user has selected engagement icon 462. Elements or structures of interface 700 corresponding to like elements or structures of interface 400 and/or interface 600 will be designated by like numerals. Similarly, the features and functions of interfaces 400 and 600 apply to the discussion of interface 600.

As depicted, interface 700 includes a navigation area 704, a document area 706, and a results area 708. This interface 700 displays a query document and associated response documents related thereto. Through interface 700, a subscriber can navigate the various generations of documents that extend from the query document. For instance, a response document that is directly linked to the query document is a first-generation response document. Similarly, a response document that is linked to a first-generation response document is a second-generation document. There can, therefore, be one or more first-generation response documents, one or more second-generation documents, etc through N-generation response documents.

The navigation area 704 displays a selected document associated with the query document. The graphical representation of the document is substantially similar to that described with respect to document area 406 of FIG. 9. Additionally, however, navigation area 704 includes a query navigation bar 710. This query navigation bar 710 enables a subscriber to navigate through the various documents associated with a query document, i.e., navigating through the various response documents associated with a query document.

As depicted, navigation bar 710 includes arrows 712 and 714 for changing the document displayed in navigation area 704. For instance, by selecting arrow 712, the displayed document is changed to the preceding generation document linked to the displayed document. Similarly, upon selected arrow 714, the displayed document is changed to the next generation document linked to the displayed document.

In addition to allowing the subscriber to move between different generations of document, navigation bar 710 indicates the particular generation level of the currently displayed document depicted in navigation area 704.

With continued reference to FIG. 15, document area 706 includes a graphical representation of a document of the chain or pedigree of documents depicted in results area 708. The particular document displayed in document area 706 is the document selected by a subscriber.

Related to the particular query document is a pedigree of documents. This pedigree of documents is graphically illustrated in results area 708 of interface 700. The graphical representation of the pedigree of documents includes a graphical representation of a query document 720 initiating the development of the pedigree of response documents 722a–722n, only three of the response documents being referenced by numerals. The query document 720 is disposed substantially centrally to one or more concentric curves 724a–724n that represent the generation levels of response documents associated with query document 720. Each response document 722a–722n is disposed upon one of concentric curves 724a–724n and linked to a one or more response documents and/or the query document. Consequently, response documents 722a–722n having the same generation level are disposed upon the same curve 724a–724n. Although reference is made to use of concentric curves to define the generation level, it can be appreciated by one skilled in the art that in alternate configuration any two-dimensional shape or three-dimensional surface or volume can be used to defined generation levels for the various response documents.

Optionally, the graphical representation of the links between adjacent documents, whether response document or query document, can graphically indicate which "branches"

of the pedigree of documents, i.e., a number of links between response documents and/or the query document, have the greatest number of linked documents. For instance, one or more links in the branch of the graphical representation of the pedigree of documents having a large number of linked documents can optionally have a more significant visual representation of the links. In one configuration, this translates to the line representations of links between adjacent documents being represented by a thicker line or line having darker color for one or more of the links of the branch closest to the query document. Other ways are known to those skilled in the art to identify a more prominent line of thought having greater number of linked documents. Although reference is made to one or more of the links closest to the query document being modified to identify the importance of the particular branch of documents, it can be understood by one skilled in the art that any number of links can be modified to depict the importance of the branch of documents.

As illustrated in FIG. 15, the graphical representation of the association of the response documents to one another and the query document is a 360° visual representation. In alternate configurations, the representation can be an 180° representation or a 90° representation. More generally, the representation can be any representation from approximately 0° to 360°, whether or not such representation is a two-dimensional or three-dimensional representation of the links between the one or more response documents and the query document.

Using interface 700 a subscriber can navigate any portion of the graphical representation of the pedigree of documents associated with a query document. For instance by selecting any document, the appropriate graphical representation of such a document is displayed in navigation area 704 and/or document area 706. Further, the graphical representation indicates which documents have been reviewed or viewed by the subscriber by changing the color or otherwise modifying the graphical representation of one or more of response documents 722a–722n and/or query document 720.

According to another aspect of the present invention, selecting one or more icons from view bar 726 can change the graphical representation of the pedigree of documents. View bar 726 includes a tree icon 728 and an outline icon 730. By selecting tree icon 728 the graphical representation of the document pedigree illustrated in interface 700 is depicted. This graphical representation depicts the flow of ideas and the documents created or based upon a query document in a thought tree or document tree structure. In contrast, by selecting icon 730 and outline representation of the pedigree of documents is depicted in results area 708. This outline representation lists the heading text and/or body text for each document based upon the generation level of the document relative to the query document. Alternatively, the outline representation can depict the pedigree of documents in linkage order, where documents for a branch are listed in sequential generation order, whether or not such sequential order flows from lowest generation to highest generation or vice versa.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A computer system for facilitating engagement of one or more subscribers, at least one being an author or owner of one or more documents, for the generation and performance tracking of ideas and intellectual work comprising:

a data store adapted to store a first document including first data indicative of a query posed by a subscriber of one or more subscribers and a second document including second data indicative of a response to said query; and a subscriber module communicating with said data store said subscriber module being adapted to enable (i) linking of said second document to said first document to include the second document in a multi-linear common hierarchical document chain along with the first document, the multi-linier common hierarchical document chain including a plurality of linked documents related to the posed query and (ii) engagement of the subscriber with at least one of said first document and said second document with a user-adjustable level of anonymity selected by the subscriber, the subscriber selectively adjusting, subsequently to selecting an initial level of anonymity, the initially selected level of anonymity corresponding to documents in the multi-linear common hierarchical document chain after documents are linked to the common hierarchical document chain, wherein the initially selected level of anonymity of the one or more documents is adjustable by the author or the owner of the documents.

2. The system as recited in claim 1, wherein said user-adjustable level of anonymity is selected from the group consisting of complete anonymity, substantially complete anonymity, selective anonymity, or public.

3. The system as recited in claim 1, wherein said engagement of the subscriber comprises performing an action using an engagement tool in association with at least one of said first document and said second document.

4. The system as recited in claim 3, wherein said action upon at least one of said first document and said second document comprises an action selected from the group consisting of accessing, modifying, annotating, making a quantitative evaluation, making a qualitative evaluation, assigning document traits, creating another document, linking another document, adding an attachment, forwarding, connecting to another document, deleting, identifying as a favorite, contacting an author of, searching for one or more other subscribers, search for other documents, search said documents, and search document traits.

5. The system as recited in claim 3, wherein performing said action generates one or more merit points.

6. The system as recited in claim 5, wherein said one or more merit points can be used to promote engagement between the subscriber and at least one of said first document, said second document, one or more other documents, and another subscriber.

7. The system as recited in claim 5, wherein said one or more merit points can be used in association with another action selected from the group consisting of identify a level of importance of the subscriber, said first document, and said second document, allowing said the subscriber to send at least one of said first document and said second document, indicating a quantity and quality of engagement, allowing the subscriber to engage with at least one of said first document, said second document and said one or more other documents, redeeming for physical world benefits, and encouraging engagement.

8. The system as recited in claim 1, wherein said subscriber module is further adapted to enable evaluation of at least one of said first document and said second document by the subscriber.

9. The system as recited in claim 8, wherein said evaluation further comprising quantitatively and qualitatively evaluating at least one of said first document and said second document.

10. The system as recited in claim 8, wherein said evaluation comprises rating at least one of said first document, said second document, and one or more other documents.

11. The system as recited in claim 1, wherein said data store further comprises a plurality of other documents linked to the common hierarchical document chain.

12. The system as recited in claim 11, wherein said subscriber module is further adapted to enable the subscriber to link at least one of said first document and said second document with at least one of said plurality of other documents such that at least one other document is included along with the first and second documents in the common hierarchical document chain.

13. The system as recited in claim 12, wherein said subscriber module is adapted to display a visual representation of said first document and a visual representation of one or more links between at least two of said first document, said second document, and said plurality of other documents.

14. The system as recited in claim 13, wherein said visual representation displays said one or more links as a concentric view orientated to one or more concentric rings identifying one or more generations of said one or more links.

15. The system as recited in claim 14, wherein said visual representation further comprises a visual representation of said query disposed substantially at a center of said visual representation of said one or more concentric rings, and said visual representation displaying substantially all of said first document, said second document, and said plurality of other documents.

16. The system as recited in claim 14, wherein said visual representation identifies which of said one or more links have been previously accessed by the subscriber.

17. The system as recited in claim 1, wherein said first document comprises a first header data and a first body data, said first header data and said first body data having predefined limited sizes to constrain a quantity of data associated with said first document.

18. The system as recited in claim 1, further comprising a plurality of other subscriber modules communicating with said data store.

19. The system as recited in claim 1, wherein said subscriber module is adapted to facilitate selection by the subscriber of one or more other subscribers to respond to said query.

20. The system as recited in claim 1, wherein the subscriber is an author of at least one of said first document, said second document, and one or more other documents, wherein said author is capable of viewing at least one of a rating and a scoring associated with one or more evaluations of said first document, said second document, and said one or more other documents.

21. The systems as recited in claim 19, wherein said subscriber module is adapted to enable said author to view one or more comments associated with said one or more evaluations.

22. The system as recited in claim 19, wherein each of said one or more evaluations comprises at least one of a quantitative scoring and a qualitative comment by the subscriber of at least one of said first document, said second document, and said one or more other documents.

23. The system as recited in claim 1, wherein one of the one or more subscribers is a query manager.

24. The system as recited in claim 1, wherein said data associated with said first document has a size limitation, wherein said first subscriber compresses said query to said size limitation.

25. The system as recited in claim 15, wherein said second document is a second generation document and is located upon a second concentric ring of said one or more concentric rings.

26. The system as recited in claim 15, wherein said visual representation identifies which of said one or more links have been previously accessed by a viewing subscriber of said one or more subscribers.

27. In a computer system for facilitating engagement of one or more subscribers, at least one being an author or owner of one or more documents for the generation and performance tracking of ideas and intellectual work, a computer-readable medium having computer-executable instructions comprising a subscriber module adapted to communicate with a data store, said subscriber module being adapted to enable (i) linking of a first document and a second document to include the second document in a mufti-linear common hierarchical document chain along with the first document, the mufti-linear common hierarchical document chain including a plurality of linked documents related to a posed query and (ii) engagement of a subscriber with at least one of said first document and said second document, the engagement of said subscriber being performed with a user-adjustable level of anonymity with respect to another subscriber said subscriber selectively adjusting, subsequently to selecting an initial level of anonymity, the initially selected level of anonymity corresponding to documents in the multi-linear document chain the after documents are linked to the multi-linear common hierarchical document chain, wherein the initially selected level of anonymity of the one or more documents is adjustable by the author or the owner of the documents.

28. The system as recited in claim 27, wherein said user-adjustable level of anonymity is selected from the group consisting of anonymity, substantial anonymity, selective anonymity, or public.

29. The system as recited in claim 27, wherein said engagement of said subscriber comprises performing any action to said at least one of said first document and said second document.

30. The system as recited in claim 27, wherein said subscriber module is further adapted to enable evaluation of at least one of said first document and said second document by at least one of said subscriber and said another subscriber.

31. The system as recited in claim 30, wherein said evaluation further comprises quantitatively evaluating and qualitatively evaluating at least one of said first document and said second document.

32. The system as recited in claim 27, wherein said subscriber module further comprises a control module, said control module being adapted to facilitate linking of said second document to said first document.

33. The system as recited in claim 32, wherein said subscriber module is adapted to display a visual representation of said link between said first document and said second document, wherein said visual representation provides visual indications of a generation level of said second document with respect to said first document on a concentric curve view.

34. The system as recited in claim 33, wherein said concentric curve view comprises one or more concentric rings, each ring representing a generation relative to said query.

35. The system as recited in claim 27, wherein said first document comprises a first header data having a predefined limited size, wherein said limited size constrains a quantity of data associated with said first document to thereby enable said subscriber to compress a header associated with said query.

36. The system as recited in claim 27, wherein said first document comprises a first body data having a predefined limited size, wherein said limited size constrains a quantity of data associated with said first document to thereby enable said subscriber to compress a body associated with said query.

37. The system as recited in claim 27, wherein said subscriber module is adapted to provide access to at least one of said first document and said second document to at least one other subscriber, wherein said at least one other subscriber, through said subscriber module, is capable of rating at least one of said first document, said second document, and one or more other documents.

38. The system as recited in claim 37, wherein said at least one other subscriber accesses said at least one of said first document and said second document via at least one of another subscriber module.

39. The system as recited in claim 38, wherein each of said subscriber module and said at least one other subscriber module is adapted to facilitate attaching another document to said first document.

40. The system as recited in claim 39, wherein said another document can be at least one of a text document, a graphical document, an audio file, a video file, and a combination thereof.

41. The system as recited in claim 39, wherein each of said subscriber module and said at least one other subscriber module is adapted to enable creation of said another document.

42. The system as recited in claim 27, wherein said subscriber module further comprises an orphanage module, said orphanage module storing one or more orphan documents accessible to one or more another subscribers.

43. The system as recited in claim 27, wherein said subscriber module is adapted to access a personal account of said subscriber, said personal account being accessible only to said subscriber.

44. The system as recited in claim 27, wherein said subscriber module further includes a manager module, said manager module being adapted to facilitate activation of one or more services associated with said subscriber module.

45. A computer program product for implementing, in a system including at least one processor and at least one data store configured to store one or more documents and is configured to enable one or more subscribers, at least one being an author or owner of one or more documents, to linking the one or more documents and engage with the one or more documents, the computer program product comprising:
  a computer readable medium carrying computer executable instructions for implementing the method, the computer executable instructions, when executed, causing the system to perform—the following:
    a step for displaying a first document to a subscriber of one or more subscribers;
    a step for linking at least one another document to said first document to include the at least one other document in a multi-linear common hierarchical document chain along with the first document, the multi-linear common hierarchical document chain including a plurality of linked documents related to the first document; and
    a step for facilitating engagement by said subscriber with said first document and said at least one other document with a user-adjustable level of anonymity selected by said subscriber, said subscriber selectively adjusting, subsequently to selecting an initial level of anonymity, the initially selected level of anonymity corresponding to documents in the multi-linear document chain after documents are linked to the multi-linear common hierarchical document chain, wherein the initially selected level of anonymity of the one or more documents is adjustable by the author or the owner of the documents.

46. A computer program product as defined in claim 45, wherein the computer readable medium further carries computer executable instructions for performing a step for displaying a visual representation of said linking of at least one another document to said first document.

47. A computer program product as defined in claim 46, wherein the computer readable medium further carries computer executable instructions for performing a step for displaying at least one generation marker as part of said visual representation.

48. A computer program product as defined in claim 46, wherein the computer readable medium further carries computer executable instructions for performing a step for defining said level of anonymity of said subscriber, said level of anonymity being selected from the group consisting of complete anonymity, substantially complete anonymity, selective anonymity, or public.

49. A computer program product as defined in claim 45, wherein the computer readable medium further carries computer executable instructions for performing a step for facilitating engagement of said subscriber with at least one of said first document and said at least one another document.

50. A computer program product as defined in claim 49, wherein the computer readable medium further carries computer executable instructions for performing a step for tracking actions performed by said subscriber to said first document and said at least one another documents.

51. A computer program product as defined in claim 50, wherein the computer readable medium further carries computer executable instructions for performing a step for generating one or more merit points for said subscriber based upon said actions performed by said subscriber.

52. A computer program product as defined in claim 51, wherein the computer readable medium further carries computer executable instructions for performing a step for tracking a number of said one or more merit points and when said number falls below a threshold value preventing said subscriber from linking said at least one another document to said first document or to other documents of said at least one another document.

53. A computer program product as defined in claim 51, wherein the computer readable medium further carries computer executable instructions for performing a step for indicating said number of said one or more merit points.

54. A computer program product as defined in claim 51, wherein the computer readable medium further carries computer executable instructions for performing a step for evaluating of at least one of said first document and said second document by said subscriber.

55. A computer program product as defined in claim 54, wherein the computer readable medium further carries computer executable instructions for performing a step for quantitatively evaluating and qualitatively evaluating at least one of said first document and said at least one another document.

56. A computer program product as defined in claim 54, wherein the computer readable medium further carries computer executable instructions for performing a step for rating at least one of said first document and said at least one another document.

57. A computer program product as defined in claim 45, wherein the computer readable medium further carries computer executable instructions for performing a step for selecting, by said subscriber, of one or more other subscribers to respond to a query contained in said first document.

58. A computer program product as defined in claim 45, wherein the computer readable medium further carries computer executable instructions for performing a step for displaying at least one of a scoring and one or more comments associated with an evaluation of said first document.

59. A computer program product as defined in claim 45, wherein the computer readable medium further carries computer executable instructions for performing a step for limiting a size of said first document, thereby encouraging said subscriber to compress a query contained in said first document to said size limitation.

* * * * *